(12) United States Patent
Johnson et al.

(10) Patent No.: US 12,098,247 B2
(45) Date of Patent: Sep. 24, 2024

(54) POLY(ETHERIMIDE), METHOD FOR THE MANUFACTURE THEREOF, AND ARTICLES COMPRISING THE POLY(ETHERIMIDE)

(71) Applicant: SHPP GLOBAL TECHNOLOGIES B.V., Bergen op Zoom (NL)

(72) Inventors: Peter Johnson, Mt. Vernon, IN (US); James Patrick Schulte, II, Mt. Vernon, IN (US); Dadasaheb V. Patil, Mt. Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 617 days.

(21) Appl. No.: 17/426,026

(22) PCT Filed: Jan. 30, 2020

(86) PCT No.: PCT/US2020/015786
§ 371 (c)(1),
(2) Date: Jul. 28, 2021

(87) PCT Pub. No.: WO2020/160205
PCT Pub. Date: Aug. 6, 2020

(65) Prior Publication Data
US 2023/0167242 A1    Jun. 1, 2023

(30) Foreign Application Priority Data
Jan. 31, 2019 (EP) .................................. 19154906

(51) Int. Cl.
*C08G 73/00* (2006.01)
*C08G 73/10* (2006.01)

(52) U.S. Cl.
CPC ..... *C08G 73/1046* (2013.01); *C08G 2650/40* (2013.01); *C08G 2650/50* (2013.01); *C08G 2650/64* (2013.01)

(58) Field of Classification Search
USPC ........................................................ 528/229
See application file for complete search history.

(56) References Cited

U.S. PATENT DOCUMENTS

| | | |
|---|---|---|
| 6,919,418 B2 | 7/2005 | Khouri et al. |
| 2013/0053489 A1 | 2/2013 | Gallucci et al. |
| 2019/0040201 A1 | 2/2019 | Patil et al. |

FOREIGN PATENT DOCUMENTS

| | | | | |
|---|---|---|---|---|
| CN | 101289537 A | * | 10/2008 | |
| CN | 113383032 A | * | 9/2021 | ......... C08G 73/1014 |
| EP | 0330739 A2 | | 9/1989 | |
| EP | 0401606 A1 | * | 12/1990 | |
| GB | 1463298 A | | 2/1977 | |
| WO | 2013028609 A1 | | 2/2013 | |
| WO | WO-2017/132656 A1 | * | 8/2017 | ............. C08G 73/10 |

OTHER PUBLICATIONS

CN-113383032-A Machine Translation (Year: 2021).*
CN-101289537-A Machine Translation (Year: 2008).*
International Search Report for the corresponding International Application No. PCT/US2020/015786; International Filing Date: Jan. 30, 2020; Date of Mailing: May 6, 2020; 5 pages.
Written Opinion for the corresponding International Application No. PCT/US2020/015786; International Filing Date: Jan. 30, 2020; Date of Mailing: May 6, 2020; 7 pages.

* cited by examiner

*Primary Examiner* — Terressa Boykin
(74) *Attorney, Agent, or Firm* — CANTOR COLBURN LLP

(57) ABSTRACT

A poly(etherimide) includes repeating units derived from polymerization of a biphenol dianhydride and an organic diamine. A method of making the poly(etherimide) includes contacting the biphenol dianhydride and the organic diamine under conditions effective to provide a poly(etherimide). The poly(etherimide) can be useful in a variety of articles, for example in an optoelectronic component.

12 Claims, 1 Drawing Sheet

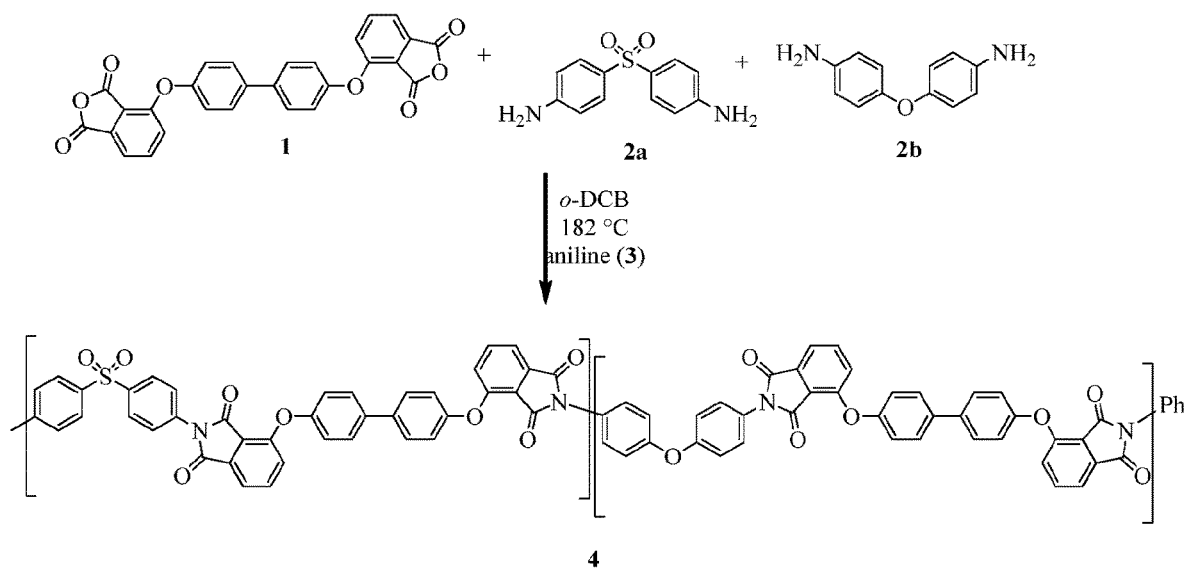

POLY(ETHERIMIDE), METHOD FOR THE MANUFACTURE THEREOF, AND ARTICLES COMPRISING THE POLY(ETHERIMIDE)

CROSS REFERENCE TO RELATED APPLICATIONS

This application is a National Stage application of PCT/US2020/015786, filed Jan. 31. 2020, which claims the benefit of European patent application No. 19154906.2 filed on Jan. 31, 2019, the contents of both of which are hereby incorporated by reference in its their entirety.

BACKGROUND

Poly(imides), and in particular poly(etherimide)s (PEI), are high performance polymers having a glass transition temperature (Tg) of greater 180° C. These polymers further have high strength, heat resistance, and modulus, and broad chemical resistance. Poly(etherimide)s are widely used in applications as diverse as automotive and electrical/electronic applications since these compositions offer good mechanical and thermal properties.

The use of known poly(etherimide)s in some high temperature applications has been limited. For example, some poly(etherimide)s have Tg values that are not sufficiently high to withstand a lead-free soldering process. Other poly (etherimide)s having higher Tg values can often display high moisture uptake, reduced thermal stability, $SO_2$ outgassing, and low dimensional stability, which can be undesirable for some applications.

Accordingly, there remains a continuing need in the art for new poly(etherimide)s that exhibit improved heat performance (e.g., high Tg and high thermal stability) and good flow properties. It would be further advantageous to simultaneously retain most of the advantageous properties associated with known poly(etherimide)s.

SUMMARY

A poly(etherimide) comprises repeating units derived from polymerization of 60 to 100 mole percent, based on total moles of dianhydride, of a biphenol dianhydride of the formula

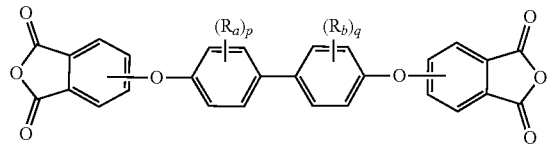

wherein $R^a$ and $R^b$ are each independently a halogen or a monovalent $C_{1-6}$ alkyl group and p and q are each independently an integer of 0 to 4, preferably wherein p and q are each 0, and wherein greater than 80% of the divalent bonds of the biphenol group are in the 3,3' position; 0 to 40 weight percent, based on total moles of dianhydride, of a dianhydride different from the biphenol dianhydride; and 100 mole percent, based on total moles of diamine, of an organic diamine comprising a first organic diamine and, optionally, a second organic diamine different from the first organic diamine, provided that when the dianhydride different from the biphenol dianhydride is present in an amount greater than 0, the organic diamine consists of the first organic diamine and when the dianhydride different from the biphenol dianhydride is not present, the organic diamine comprises the first organic diamine and the second organic diamine.

A method of making a poly(etherimide) comprises contacting 60 to 100 mole percent, based on total moles of dianhydride, of a biphenol dianhydride of the formula

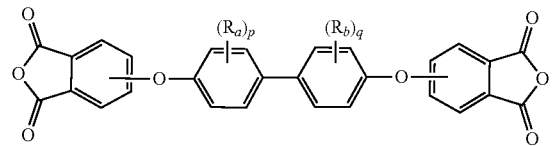

wherein $R^a$ and $R^b$ are each independently a halogen or a monovalent $C_{1-6}$ alkyl group and p and q are each independently an integer of 0 to 4, preferably wherein p and q are each 0, and wherein greater than 80% of the divalent bonds of the biphenol group are in the 3,3' position; 0 to 40 weight percent, based on total moles of dianhydride, of a dianhydride different from the biphenol dianhydride; and 100 mole percent, based on total moles of diamine, of an organic diamine comprising a first organic diamine and, optionally, a second organic diamine different from the first organic diamine, provided that when the dianhydride different from the biphenol dianhydride is present in an amount greater than 0, the organic diamine consists of the first organic diamine and when the dianhydride different from the biphenol dianhydride is not present, the organic diamine comprises the first organic diamine and the second organic diamine; under conditions effective to provide a poly(etherimide).

An article comprises the poly(etherimide).

The above described and other features are exemplified by the following FIGURES and detailed description.

BRIEF DESCRIPTION OF THE DRAWINGS

The following FIGURE is an exemplary embodiment.
FIG. 1 is a chemical scheme showing the synthesis of a polymer according to an aspect of the present disclosure.

DETAILED DESCRIPTION

The present inventors have unexpectedly found that a poly(etherimide) having improved properties can be prepared from polymerization of a particular biphenol dianhydride and one or more organic diamines or a particular biphenol dianhydride in combination with a second dianhydride and a single organic diamine. Advantageously, the poly(etherimide) can exhibit high heat performance, low coefficient of thermal expansion (CTE), good mechanical properties, and improved flow at high shear.

Accordingly, an aspect of the present disclosure is a poly(etherimide) comprising repeating units derived from polymerization of a biphenol dianhydride of the formula (I)

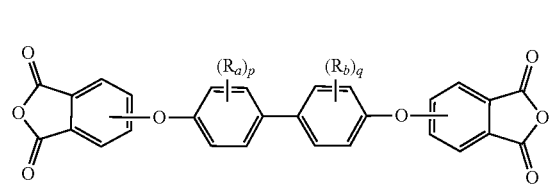

wherein $R^a$ and $R^b$ are each independently a halogen or a monovalent $C_{1-6}$ alkyl group and p and q are each independently an integer of 0 to 4. In some embodiments, p and q are each zero. In some embodiments, p, q, or both can be 1 to 4, preferably 1 to 2, more preferably 1. In some embodiments, $R^a$ and $R^b$ are each independently a monovalent $C_{1-6}$ alkyl group, preferably a methyl group. At least 80% of the divalent bonds of the biphenol group are in the 3,3' position. Preferably, at least 90%, or at least 95% or at least 99% of the divalent bonds of the biphenol group are in the 3,3' position. The remaining divalent bonds of the biphenol group can be in the 3,4' position or the 4,4' position. Preferably, the divalent bonds of the biphenol group can be in the 3,3' position (i.e., 100% of the divalent bonds of the biphenol group can be in the 3,3' position). In a specific embodiment, the biphenol dianhydride can be of the formula (IA)

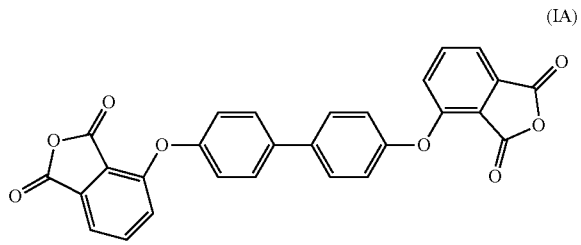 [SMILES: O=C1OC(=O)c2c(Oc3ccc(-c4ccc(Oc5cccc6c5C(=O)OC6=O)cc4)cc3)cccc21]

(IA)

The poly(etherimide) can comprise repeating units derived from polymerization of 60 to 100 mole percent of the biphenol dianhydride, based on the total moles of the dianhydride. In some embodiments, the poly(etherimide) can comprise repeating units derived from polymerization of 100 mole percent of the biphenol dianhydride (i.e., no other dianhydrides are present). In some embodiments, the poly (etherimide) can comprise repeating units derived from polymerization of 70 to 95 mole percent of the biphenol dianhydride.

The poly(etherimide) can optionally further comprise additional repeating units derived from polymerization of a dianhydride different from the biphenol dianhydride. The dianhydride different from the biphenol dianhydride can be present in the poly(etherimide) in an amount of 0 to 40 weight percent, or 5 to 30 weight percent, or 6 to 21 weight percent, based on total moles of dianhydride. The dianhydride different from the biphenol dianhydride can be of the formula (II) or (III)

(II)

(III)

wherein T is —O— or a group of the formula —O—Z—O— wherein the divalent bonds of the —O— or the —O—Z—O— group are in the 3,3', 3,4', 4,3', or the 4,4' positions, and Z is an aromatic $C_b u$ monocyclic or polycyclic group optionally substituted with 1 to 6 $C_{1-8}$ alkyl groups, 1-8 halogen atoms, or a combination thereof; and $R^1$ and $R^2$ are each independently a hydrogen, a $C_{1-8}$ alkyl group, a halogen, or a combination thereof, preferably hydrogen. Preferably, Z can be a group derived from a dihydroxy compound of the formula (IV)

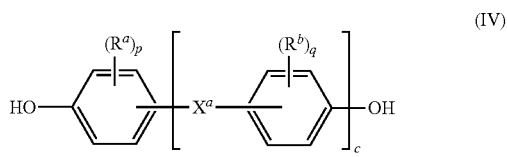

(IV)

wherein $R^a$, $R^b$, p and q are as defined above; c is 0 to 4; and $X^a$ is —O—, —S—, —S(O)—, —SO_2—, —C(O)—, or a $C_{1-18}$ organic bridging group. In some embodiments, the poly(etherimide) further comprises the second dianhydride of the formula (II). In some embodiments, the poly(etherimide) further comprises the second dianhydride of the formula (III). In some embodiments, the poly(etherimide) can exclude repeating units derived from a dianhydride other than the dianhydride of formula (I). In a specific embodiment, the poly(etherimide) can exclude repeating units derived from formula (III).

The biphenol dianhydride and, when present, the dianhydride different from the biphenol dianhydride are polymerized with an organic diamine. The organic diamine comprises a first organic diamine and optionally, a second organic diamine. When the dianhydride different from the biphenol dianhydride is present in an amount greater than 0, the organic diamine consists of the first organic diamine. When the dianhydride different from the biphenol dianhydride is not present, the organic diamine comprises the first organic diamine and the second organic diamine.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis (p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, 4,4'-oxydianiline, or a combination thereof. In an embodiment, the organic diamine comprises 4,4'-diaminodiphenylsulfone, 4,4'-oxydianiline, meta-phenylene diamine, para-phenylene diamine, or a combination thereof. In some embodiments, the organic diamine comprises a combination of meta-phenylene diamine and 4,4'-diaminodiphenylsulfone; or a combination of para-phenylene diamine and 4,4'-oxydianiline; or a combination of para-phenylene diamine and meta-phenylene diamine; or a combination of meta-phenylenediamine and 4,4'-oxydianiline. For example, in an embodiment in which the dianhydride different from the biphenol dianhydride is not present, the first organic diamine comprises meta-phenylene diamine and the second organic diamine comprises 4,4'-diaminodiphenylsulfone; or the first organic diamine comprises para-phenylene diamine and the second organic diamine comprises 4,4'-oxydianiline; or the first organic diamine comprises para-phenylene diamine and the second organic diamine comprises meta-phenylene diamine; or the first organic diamine comprises meta-phenylenediamine and the second organic diamine comprises 4,4'-oxydianiline.

The poly(etherimide) can comprise repeating units derived from polymerization of 100 mole percent of the organic diamine, based on the total moles of the biphenol dianhydride and the organic diamine. In some embodiments, the poly(etherimide) can comprise repeating units derived from polymerization of 10 to 90 mole percent, or 20 to 80 mole percent, or 30 to 70 mole percent, or 40 to 60 mole percent, or 45 to 55 mole percent of the first organic diamine and 10 to 90 mole percent, or 20 to 80 mole percent, or 30 to 70 mole percent, or 40 to 60 mole percent, or 45 to 55 mole percent of the second organic diamine, based on the total moles of diamine. In some embodiments, the poly(etherimide) can comprise repeating units derived from polymerization of 10 to 90 mole percent, or 20 to 80 mole percent, or 30 to 70 mole percent, or 40 to 60 mole percent, or 45 to 55 mole percent of meta-phenylene diamine and 10 to 90 mole percent, or 20 to 80 mole percent, or 30 to 70 mole percent, or 40 to 60 mole percent, or 45 to 55 mole percent of 4,4'-diaminodiphenylsulfone, based on the total moles of diamine; or 20 to 80 mole percent, or 40 to 60 mole percent, or 45 to 55 mole percent of para-phenylene diamine and 20 to 80 mole percent, or 40 to 60 mole percent, or 45 to 55 mole percent of 4,4'-oxydianiline, based on the total moles of diamine; or 20 to 80 mole percent, or 25 to 75 mole percent, or 30 to 70 mole percent, or 35 to 65 mole percent, or 40 to 60 mole percent, or 45 to 55 mole percent meta-phenylene diamine and 20 to 80 mole percent, or 25 to 75 mole percent, or 30 to 70 mole percent, or 35 to 65 mole percent, or 40 to 60 mole percent, or 45 to 55 of para-phenylene diamine, based on the total moles of diamine; or 25 to 75 mole percent, or 40 to 60 mole percent, or 45 to 55 mole percent of meta-phenylene diamine and 25 to 75 mole percent, or 40 to 60 mole percent, or 45 to 55 mole percent of 4,4'-oxydianiline, based on total moles of diamine.

In an embodiment, the poly(etherimide) comprises repeating units derived from polymerization of 100 mole percent, based on total moles of dianhydride, of the biphenol dianhydride; and 100 mole percent, based on total moles of diamine, of the first organic diamine and the second organic diamine. In another embodiment, the poly(etherimide) comprises repeating units derived from polymerization of 70 to 95 mole percent, based on total moles of dianhydride, of the biphenol dianhydride; 5 to 30 weight percent, based on total moles of dianhydride, of the dianhydride different from the biphenol dianhydride; and 100 mole percent, based on total moles of diamine, of the first organic diamine.

The poly(etherimide) can optionally further comprise at least one chain end derived from a chain stopper (also referred to as an endcapping agent). Chain stoppers can be employed during the polymerization reaction. The chain stopper limits molecular weight growth rate and thus can be used to control molecular weight in the poly(etherimide). Exemplary chain stoppers include certain mono amines (for example aniline), mono anhydrides (for example phthalic anhydride), mono-phenolic compounds and the like. In some embodiments, the chain stopper can preferably be a monoamine chain stopper or a monoanhydride chain stopper, more preferably aniline or phthalic anhydride. It should be understood however that the poly(etherimide)poly(etherimide)s disclosed herein can be produced having any desired weight average molecular weight (Mw) with any end cap. Chain stoppers can be present, for example, in an amount of 1 to 10 mole percent, based on the total moles of dianhydride, diamine, and chain stopper.

In a specific embodiment, the poly(etherimide) can be derived from polymerization of 100 mole percent of a biphenol dianhydride of the formula (IA), based on the total moles of dianhydride, 100 mole percent of the organic diamine, based on total moles of diamine, preferably wherein the organic diamine comprises 4,4'-diaminodiphenylsulfone, 4,4'-oxydianiline, meta-phenylene diamine, para-phenylene diamine, or a combination thereof, and 1 to 10 mole percent of a chain stopper, wherein mole percent of chain stopper is based on the total moles of the biphenol dianhydride, the organic diamine, and the chain stopper.

In an embodiment, the poly(etherimide) can be derived from polymerization of 100 mole percent of a biphenol dianhydride of the formula (IA); 100 mole percent of the organic diamine, wherein the organic diamine comprises the first organic diamine and the second organic diamine; wherein the first organic diamine comprises meta-phenylene diamine and the second organic diamine comprises 4,4'-diaminodiphenylsulfone; or the first organic diamine comprises para-phenylene diamine and the second organic diamine comprises 4,4'-oxydianiline; or the first organic diamine comprises para-phenylene diamine and the second organic diamine comprises meta-phenylene diamine; or the first organic diamine comprises meta-phenylenediamine and the second organic diamine comprises 4,4'-oxydianiline; and 1 to 10 mole percent of a chain stopper, based on the total moles of the dianhydride, diamine, and the chain stopper.

In an embodiment, the poly(etherimide) can be derived from polymerization of 65 to 85 mole percent of a biphenol dianhydride of the formula (IA); 15 to 35 mole percent of the dianhydride different from the biphenol dianhydride of the formula (II) or (III); and 100 mole percent of the organic diamine consisting of the first organic diamine, wherein the first organic diamine is 4,4'-diaminodiphenylsulfone, 4,4'-oxydianiline, meta-phenylene diamine, para-phenylene diamine, or a combination thereof, preferably meta-phenylene diamine; and 1 to 5 mole percent of a chain stopper, based on the total moles of the biphenol dianhydride, the second dianhydride, the organic diamine, and the chain stopper.

In a specific embodiment, the poly(etherimide) can be derived from polymerization of 100 mole percent of a biphenol dianhydride of the formula (IA), based on total moles of dianhydride and 10 to 90 mole percent, or 20 to 80 mole percent, or 30 to 70 mole percent, or 40 to 60 mole percent, or 45 to 55 mole percent of meta-phenylene diamine and 10 to 90 mole percent, or 20 to 80 mole percent, or 30 to 70 mole percent, or 40 to 60 mole percent, or 45 to 55 mole percent of 4,4'-diaminodiphenylsulfone, based on the total moles of diamine. The poly(etherimide) can further include 2.5 to 6 mole percent of a chain stopper, wherein mole percent is based on the total moles of the biphenol dianhydride, the organic diamine, and the chain stopper. In a very specific embodiment, the poly(etherimide) can be derived from polymerization of 100 mole percent of a biphenol dianhydride of the formula (IA), based on total moles of dianhydride 40 to 60 mole percent of meta-phenylene diamine and 40 to 60 mole percent of 4,4'-diaminodiphenylsulfone, based on the total moles of diamine. The poly(etherimide) can further include 4 to 6 mole percent of a chain stopper, wherein mole percent is based on the total moles of the biphenol dianhydride, the organic diamine, and the chain stopper.

In a specific embodiment, the poly(etherimide) can be derived from polymerization of 100 mole percent of a biphenol dianhydride of the formula (IA) and 20 to 80 mole percent, or 40 to 60 mole percent, or 45 to 55 mole percent of para-phenylene diamine and 20 to 80 mole percent, or 40 to 60 mole percent, or 45 to 55 mole percent of 4,4'-oxydianiline, based on the total moles of diamine. The poly(etherimide) can further include 2 to 7 mole percent of a chain stopper, wherein mole percent is based on the total moles of the biphenol dianhydride, the organic diamine, and the chain stopper.

In a specific embodiment, the poly(etherimide) can be derived from polymerization of 100 mole percent of a biphenol dianhydride of the formula (IA), based on total moles of dianhydride and 20 to 80 mole percent, or 25 to 75 mole percent, or 30 to 70 mole percent, or 35 to 65 mole percent, or 40 to 60 mole percent, or 45 to 55 mole percent meta-phenylene diamine and 20 to 80 mole percent, or 25 to 75 mole percent, or 30 to 70 mole percent, or 35 to 65 mole percent, or 40 to 60 mole percent, or 45 to 55 of para-phenylene diamine, based on the total moles of diamine. The poly(etherimide) can further include 4.5 to 6.5 mole percent of a chain stopper, wherein mole percent is based on the total moles of the biphenol dianhydride, the organic diamine, and the chain stopper.

In a specific embodiment, the poly(etherimide) can be derived from polymerization of 100 mole percent of a biphenol dianhydride of the formula (IA), based on total moles of dianhydride and 25 to 75 mole percent, or 40 to 60 mole percent, or 45 to 55 mole percent of meta-phenylene diamine and 25 to 75 mole percent, or 40 to 60 mole percent, or 45 to 55 mole percent of 4,4'-oxydianiline, based on total moles of diamine. The poly(etherimide) can further include 5.5 to 6.5 mole percent of a chain stopper, wherein mole percent is based on the total moles of the biphenol dianhydride, the organic diamine, and the chain stopper In a specific embodiment, the poly(etherimide) can be derived from polymerization of 100 mole percent of a biphenol dianhydride of the formula (IA), based on total moles of dianhydride and 40 to 60 mole percent, or 45 to 55 mole percent of 4,4'-oxydianiline and 40 to 60 mole percent, or 45 to 55 mole percent of 4,4'-diaminodiphenylsulfone, based on total moles of diamine. The poly(etherimide) can further include 2.5 to 5 mole percent of a chain stopper, wherein mole percent is based on the total moles of the biphenol dianhydride, the organic diamine, and the chain stopper.

In another specific embodiment, the poly(etherimide) can be derived from polymerization of 65 to 85 mole percent of a biphenol dianhydride of the formula (IA), 15 to 35 mole percent of a second dianhydride of the formula (II) or (III), preferably wherein in formula (II), T is —O— and the divalent bonds of the —O— are in the 3,3', 3,4', 4,3', or the 4,4' positions, preferably the 4,4' positions, and in formula (III), $R^1$ and $R^2$ are hydrogen, 100 mole percent of the organic diamine, preferably wherein the organic diamine comprises 4,4'-diaminodiphenylsulfone, 4,4'-oxydianiline, meta-phenylene diamine, para-phenylene diamine, or a combination thereof, preferably meta-phenylene diamine, and 1 to 5 mole percent of a chain stopper, wherein mole percent of each component is based on the total moles of the biphenol dianhydride, the second dianhydride, the organic diamine, and the chain stopper.

The poly(etherimide) of the present disclosure can have one or more advantageous properties. For example, the poly(etherimide) can have a Tg of greater than 240° C., preferably greater than 275° C., more preferably 270 to 290° C., even more preferably 275 to 280° C. In some embodiments, the poly(etherimide) can have two glass transition temperatures, wherein at least one is in the range of 270 to 290° C. The poly(etherimide) can have an onset decomposition temperature of greater than 520° C., or greater than 540° C., or greater than 545° C. under air or nitrogen, as determined by Thermal Gravimetric Analysis. The poly(etherimide) can be transparent. The poly(etherimide) can be amorphous. The poly(etherimide) can have a parallel plate viscosity of 2000 to 35000 poise (P). In some embodiments, the poly(etherimide) can have a viscosity of less than 20000 P, preferably less than 8000 P, for example 2000 to 20000 P, or 2000 to 8000 P. In some embodiments, the poly(etherimide) does not exhibit a melting point as measured by differential scanning calorimetry.

A method of making the poly(etherimide) represents another aspect of the present disclosure. The method of making the poly(etherimide) comprises contacting the biphenol dianhydride of formula (I) with the organic diamine, specifically, contacting 60 to 100 mole percent of the biphenol dianhydride, 0 to 40 weight percent, based on total moles of dianhydride, of a dianhydride different from the biphenol dianhydride, and 100 mole percent of the organic diamine. When the dianhydride different from the biphenol dianhydride is present, the organic diamine consists of the first organic diamine. When the dianhydride different from the biphenol dianhydride is not present, the organic diamine comprises a first and second organic diamine. The contacting is under conditions effective to provide the poly(etherimide).

Conditions effective to provide the poly(etherimide) can include a temperature of 170 to 380° C., and a solids content of 1 to 50 weight percent, preferably 20 to 40 weight percent, more preferably 25 to 35 weight percent. Polymerizations can be carried out for 2 to 24 hr, preferably 3 to 16 hr. The polymerization can be conducted at reduced, atmospheric, or high pressure. In some embodiments, the method can optionally further comprise devolatilizing the poly(etherimide) at 360 to 390° C. for 1 to 30 minutes. Contacting the biphenol dianhydride and the organic diamine can be in the presence of a solvent. Exemplary solvents can include ortho-dichlorobenzene, para-dichlorobenzene, meta-dichlorobenzene, meta-cresol, para-cresol, ortho-cresol, N-methylpyrrolidone, veratrole, chlorobenzene, xylene, 1,2,4-trichlorobenzene, 1,3,4-trichlorobenzene, ethyl benzoate, triglyme, benzonitrile, 3-nitrotoluene, 2-nitrotoluene, 1-nitrotoluene, 1,3-dimethyl-2-imidazolidinone, dimethyl acetamide, diphenyl ether, phenetole, sulfolane, or a combination thereof.

The poly(etherimide) of the present disclosure can be useful for forming various articles. The poly(etherimide) can be formed into articles using any suitable technique, for example, melt-processing techniques. Melt-molding methods can include injection molding, extrusion molding, blow molding, rotational molding, coining, and injection blow molding. For example, the melt molding method can be injection molding. In some embodiments, extrusion molding can be particularly suitable for the poly(etherimides) of the present disclosure. The poly(etherimide) can be formed into sheets or films by casting, blowing, or extruding. These can be further thermoformed into articles and structures that can be oriented from the melt or at a later stage in the processing of the compositions. The poly(etherimide) can be overmolded onto an article made from a different material or by a different process. The articles can also be formed using techniques such as compression molding or ram extruding. The articles can be further formed into other shapes by machining. Exemplary articles include a fiber, a film, a sheet, a foam, a filament, a molded article, an extruded article, or a powder. The properties of the poly(etherimide) of the present disclosure can be particularly suitable for forming thin-walled molded articles. In some embodiments, the article can be an extruded film or an extruded sheet. The poly(etherimide) of the present disclosure can also be particularly suitable for use in optoelectronic applications. In particular, the poly(etherimide) can be used for optoelectronic articles such as transmitters, receivers, connectors, lenses, waveguides, and the like.

Accordingly, the present disclosure provides improved poly(etherimide)s having physical properties making them particularly well suited for use in optoelectronic systems.

This disclosure is further illustrated by the following examples, which are non-limiting.

EXAMPLES

Materials used for the following examples are described in Table 1.

TABLE 1

| Material | Description |
|---|---|
| 3,3'-BPoDA | 3,3'-biphenoldianhydride |
| PA | Phthalic anhydride |
| m-PD | Meta-phenylene diamine |
| 4,4'-DOS | 4,4'-diaminodiphenylsulfone |
| aniline | Aniline |
| p-PD | Para-phenylene diamine |
| 4,4'-ODA | 4,4'-oxydianiline |
| 4,4'-ODPA | 4,4'-oxydiphthalic dianhydride |
| PMDA | Pyromellitic dianhydride |
| o-DCB | Ortho-dichlorobenzene |
| ODA | Octadecylamine |

Properties of the polymers that were determined are summarized in Table 2, including the method of measurement.

TABLE 2

| Properties | Unit | Method |
|---|---|---|
| Tg | ° C. | DSC, ASTMD3418 |
| $T_M$ | ° C. | DSC, ASTMD3418 |
| TGA Air | ° C., Onset Temp | |
| TGA N2 | ° C., Onset Temp | |
| TGA Isothermal | Mass loss at 450° C. | |
| Viscosity | P, 400° C. | ASTM D4440 |
| | % change, 400° C., 1800 s | ASTM D4440 |

Glass transition temperature ($T_g$) and melting temperature ($T_m$) were determined using Differential Scanning Calorimetry (DSC) according to ASTM D3418. The test was performed using a TA Q1000 DSC instrument. In a typical procedure, a polymer sample (10-20 milligrams) was heated from 40 to 400° C. at a rate of 20° C./min, held at 400° C. for 1 minute, cooled to 40° C. at a rate of 20° C./min, then held at 40° C. for 1 minute, and the above heating cycle was repeated. The second heating cycle is usually used to obtain the $T_g$ and $T_m$.

Thermal Gravimetric Analysis (TGA) measurements were performed with a TA Q800 TGA. The samples were heated from 40° C. to 800° C., under nitrogen or air, with a heating rate of 20° C./min. The onset temperature is an extrapolated onset temperature as measured by the intersection of tangents according to ISO 11358-1. Weight loss percent is calculated from the initial mass and mass at 800° C. TGA isothermal was measured under nitrogen with a heating rate of 20° C./min. After reaching the temperature of 450° C., the sample is maintained at a constant temperature for 60 minutes. The total mass remaining upon reaching 450° C. was recorded, and the total mass remaining after 60 minutes at 450° C. was recorded. The percent change between these two values was measured. This measurement indicates the stability of the material at long times under intense simulated melt processing conditions. If significant gas loss occurs, then gases formed would create issues during injection molding or extrusion.

Parallel plate viscosity was measured as complex viscosity on an ARES strain controlled rheometer. Measurements were performed using 25 mm circular parallel-plate geometry at a 1% oscillatory strain, a frequency of 1 Hz, temperature of 400° C., and a fixed gap of 1 mm. The percent change in viscosity was determined from the viscosity of the initial measurement data point and the viscosity at 1800 s of measurement time.

"Polymer phase" refers to, during the polymerization process, the state of the polymer after the polymerization has reached the greatest extent of reaction with the solvent present. If there is polymer precipitated in the solution as an opaque or hazy solid, the "polymer phase" is considered to be a precipitate (labeled "P"). If the polymer remains in solution, the polymer phase is in solution and homogenous (labeled "H"). Instead of units, the solvent used in the polymerization process is specified.

Samples for analysis by GPC were prepared by dissolving 40-45 milligrams of the polymer solids in 10 milliliters of a 4:1 mixture of methylene chloride/hexafluoroisopropanol. The solution was filtered through a 0.45 micrometer filter, and then analyzed by GPC. Polymerization stoichiometry was determined by Fourier transform infrared (FTIR) analysis.

The following examples were conducted according to the synthetic scheme illustrated in FIG. 1. All molecular weights were determined by gel permeation chromatography (GPC) relative to polystyrene standards. Prior to GPC analysis, samples were devolatilized by placing a glass culture tube in a hot block at 380° C. A one-sided Teflon-coated foil was rolled to make a cylinder with a folded bottom, ensuring that the foil was facing outward and the Teflon-coated side was facing inward. A sample (2 g) of pre-polymer solids was transferred into the foil cylinder and then the cylinder was placed inside of the glass culture tube. The contents were heated for 20 to 30 minutes under a flow of nitrogen, then cooled to ambient temperature. GPC analysis was then performed on the devolatilized samples. Alternatively, the pre-polymer solids were fed into a Haake compounder at 380° C. under a blanket of nitrogen at 20 standard cubic feet per minute (scfm) and agitated at 50 rpm. The samples were heated and mixed for 15 to 30 minutes before removing from the Haake bowl. Post-Haake samples were then analyzed for molecular weight. The resulting polymer was finely ground.

Example 1

A 250 mL 3-neck round-bottom flask equipped with a Dean-Stark trap, condenser, mechanical stirrer, and nitrogen inlet was charged with 3,3'-BPoDA (18.76 g, 39.22 mmol), PA (0.6879 g, 4.644 mmol), m-PD (0.8903 g, 8.233 mmol), 4,4'-DDS (8.164 g, 32.88 mmol), and o-DCB (106.8 g). The flask was placed in an oil bath at 25° C., under nitrogen (N2, 15 scfh), agitated at 200 rpm, and heated to 200° C. After a total of 90 minutes (min), 35 g of distillate (o-DCB/H$_2$O) was removed from the Dean-Stark trap and the nitrogen flow was reduced to 0.5 scfh.

After 7.5 hours (hr), additional m-PD (0.0233 g), 4,4'-DDS (0.2136 g) and PA (0.0180 g) were added with o-DCB (7 g) based on the stoichiometric analysis by FTIR analysis of a reaction sample. The polymerization was heated overnight. Additional 3,3'-BPoDA (0.2677 g) was then added, based on the stoichiometric analysis of a reaction sample. The reaction continued overnight, then the flask containing a biphasic mixture was removed from the oil bath, allowed to cool to ambient temperature, and subsequently air dried. GPC analysis of a devolatilized sample indicated this material had a weight average molecular weight (Mw) of 33,946 grams per mole (g/mol). Hot-pressing the sample provided a highly transparent yellow film with a Tg of 282° C.

Example 2

A 1000 mL 3-neck round-bottom flask equipped with a Dean-Stark trap, condenser, mechanical stirrer, and nitrogen inlet was charged with m-PD (6.833 g, 63.19 mmol), aniline (1.420 g, 1.389 mL, 15.25 mmol), and o-DCB (130 g). The flask was placed in an oil bath at 25° C., under nitrogen (15 scfh), agitated at 250 rpm, and heated to 60° C.

After 10 min the flask was charged with 3,3'-BPoDA (79.214 g, 165.6 mmol), 4,4'-DDS (23.532 g, 94.77 mmol), and o-DCB (284 g). The flask was agitated at 150 rpm and heated to 185° C. After 15 min agitation was reduced to 70 rpm throughout the glue ball stage (i.e., where the reaction solids became a sticky mass; 175-178° C.). Agitation was increased to 250 rpm. After 3 hr, 175 g of distillate (o-DCB/H$_2$O) was removed from the Dean-Stark trap and the nitrogen flow was reduced to 0.5 scfh. The reaction became a homogenous yellow solution.

After 5 hr and 20 min a second glue ball stage was observed. After 6 hr and 5 min, the flask containing a biphasic mixture was removed from the oil bath, diluted with additional o-DCB (117 g), and allowed to cool to 70° C. The yellow solids were broken up with a spatula and filtered onto a fine-fritted glass funnel, then air dried overnight. GPC analysis of a devolatilized sample indicated this material had an Mw of 24,866 g/mol. Hot-pressing provided a highly transparent yellow film with a Tg of 281° C.

Example 3

A 1000 mL 3-neck round-bottom flask equipped with a Dean-Stark trap, condenser, mechanical stirrer, and nitrogen inlet was charged with m-PD (6.814 g, 63.01 mmol), aniline (1.501 g, 1.469 mL, 16.12 mmol), and o-DCB (130 g). The flask was placed in an oil bath at 25° C. under nitrogen (15 scfh), agitated at 250 rpm, and heated to 60° C.

After 15 min the flask was charged with 3,3'-BPoDA (79.217 g, 165.6 mmol), 4,4'-DDS (23.469 g, 94.52 mmol), and o-DCB (284 g). The flask was agitated at 150 rpm and heated to 185° C. After 15 min agitation was reduced to 70 rpm throughout the glue ball stage, (175-180° C.). Agitation was increased to 250 rpm. After 2 hr and 40 min, 175 g of distillate (o-DCB/H$_2$O) was removed from the Dean-Stark trap and the nitrogen flow was reduced to 0.5 scfh. The reaction became a homogenous yellow solution.

After 5 hr and 20 min a second glue ball stage was observed. After 6 hr and 20 min, the flask containing a biphasic mixture was removed from the oil bath, diluted with additional o-DCB (117 g), and allowed to cool to 70° C. The yellow solids were broken up with a spatula and filtered onto a fine-fritted glass funnel, then air dried in the hood overnight. GPC analysis of a devolatilized sample indicated this material had an Mw of 21,439 g/mol. Hot-pressing provided a highly transparent yellow film with a Tg of 275° C.

Example 4

A 1000 mL 3-neck round-bottom flask equipped with a Dean-Stark trap, condenser, mechanical stirrer, and nitrogen inlet was charged with 3,3'-BPoDA (55.30 g, 115.6 mmol), m-PD (4.744 g, 43.87 mmol), 4,4'-DDS (16.34 g, 65.80 mmol), aniline (1.101 g, 11.83 mmol), and o-DCB (289 g, 222 mL). The flask was placed in an oil bath at 25° C. under nitrogen (15 scfh), agitated at 200 rpm, and heated in an oil bath set to 200° C.

After 90 min, the o-DCB/H$_2$O distillate (23.42 g) was drained from the trap. After an additional 75 min, more o-DCB distillate (26.45 g) was removed from the trap. The nitrogen flow was reduced and after heating for a total of 4.5 hr, the oil bath temperature was lowered to 180° C. and the polymerization was allowed to continue overnight.

After an additional 16 hr at 180° C., the heat was removed. The pre-polymer slurry was filtered onto a Buchner funnel using a Whatman #4 filter paper. The solids were air dried in a hood overnight. GPC analysis of a devolatilized sample indicated this material had an Mw of 26,094 g/mol. Hot-pressing provided a highly transparent yellow film with a Tg of 282° C.

Example 5

A 1000 mL 3-neck round-bottom flask equipped with a Dean-Stark trap, condenser, mechanical stirrer, and nitrogen inlet was charged with 3,3'-BPoDA (80.058 g, 167.3 mmol), m-PD (7.7687 g, 71.839 mmol), 4,4'-DDS (21.8015 g, 87.80 mmol), aniline (1.4338 g, 1.403 mL, 15.40 mmol), and o-DCB (414 g, 318 mL, 2816.3 mmol). The flask was placed in an oil bath at 25° C. under nitrogen (15 scfh), agitated at 150 rpm, and heated to 192° C.

After fifty min, agitation was increased to 440 rpm for 1 minute when the mixture became a highly viscous slurry (167-181° C.). After the solids broke up, agitation was decreased to 300 rpm. After a total of 1 hour a glue ball stage (187-188° C.) was observed whereupon agitation was decreased to 100 rpm. After the glue ball stage agitation was increased to 275 rpm. After an additional 5 min the mixture became a homogenous yellow solution. After a total of 2 hr, 175 g of distillate (o-DCB/H$_2$O) was removed from the Dean-Stark trap, the nitrogen flow was reduced to 0.5 scfh, and the temperature was lowered to 185° C.

After 5 hr and 20 min the mixture became opaque. Additional o-DCB (117 g) was added to the flask to form a biphasic mixture. The oil bath temperature was raised to 192° C. and nitrogen flow was increased to 15 scfh. After 6 hr and 10 min, 117 g of distillate was removed from the Dean-Stark trap and additional o-DCB (117 g) was added to the biphasic mixture. After 6 hr and fifty min, 117 g of distillate was removed from the Dean-Stark trap and observed to contain coarse solids. The nitrogen flow was decreased to 5 scfh, additional o-DCB (117 g) was added, and a large aggregated mass formed which was briefly broken up with the aid of a spatula. After an additional 15 min, agitation was increased to 560 rpm and after a few min the mass broke up to form a coarse slurry. Heating was discontinued and after an additional 15 min a fine slurry formed.

After 7 hr and forty min agitation was discontinued, the flask was removed from the oil bath, and allowed to cool to ambient temperature. The yellow solids were filtered onto a fine-fritted glass funnel, then air dried in the hood overnight. GPC analysis of a devolatilized sample indicated this material had an Mw of 24,376 g/mol. Hot-pressing provided a highly transparent creasable yellow film with a Tg of 279° C.

Example 6

A 250 mL 3-neck round-bottom flask equipped with a Dean-Stark trap, condenser, mechanical stirrer, and nitrogen inlet was charged with 3,3'-BPoDA (22.90 g, 47.86 mmol), 4,4'-DDS (6.061 g, 24.41 mmol), PA (0.4401 g, 2.971 mmol), m-PD (2.645 g, 24.46 mmol), and o-DCB (119.80 g). The flask was placed in an oil bath at 25° C., under nitrogen (15 scfh), agitated at 200 rpm, and heated to 200° C.

After 45 min a glue ball stage was observed, during which agitation was reduced to 75 rpm. After 5 min, the mixture became homogenous and agitation was increased to 200 rpm. After an additional 90 min, 50 g of distillate (o-DCB/H$_2$O) was removed from the Dean-Stark trap and the nitrogen flow was reduced to 0.5 scfh. The polymerization was continued overnight at 190° C.

After a total of 24.75 hr, the flask containing a biphasic mixture was removed from the oil bath, allowed to cool to ambient temperature, then air dried in the hood overnight. GPC analysis of a devolatilized sample indicated this material had an Mw of 34,693 g/mol. Hot-pressing provided a highly transparent yellow film with a Tg of 284° C.

Example 7

A 250 mL 3-neck round-bottom flask equipped with a Dean-Stark trap, condenser, mechanical stirrer, and nitrogen inlet was charged with 3,3'-BPoDA (22.28 g, 42.38 mmol), 4,4'-DDS (5.425 g, 21.85 mmol), PA (0.5291 g, 3.572 mmol), m-PD (2.363 g, 21.85 mmol), and o-DCB (106.9 g). The flask was placed in an oil bath at 25° C., under nitrogen (15 scfh), agitated at 200 rpm, and heated to 200° C. After 2 hr, 45 g of distillate (o-DCB/H$_2$O) was removed from the Dean-Stark trap and the nitrogen flow was reduced to 0.5 scfh. The polymerization was allowed to continue overnight at 190° C.

After a total of 18.5 hr, the flask containing a biphasic mixture was removed from the oil bath, allowed to cool to ambient temperature, then air dried in the hood overnight. GPC analysis of a devolatilized sample indicated this material had an Mw of 26,715 g/mol. Hot-pressing provided a highly transparent yellow film with a Tg of 281° C.

Example 8

A 1000 mL 3-neck round-bottom flask equipped with a Dean-Stark trap, condenser, mechanical stirrer, and nitrogen inlet was charged with m-PD (8.725 g, 80.68 mmol), aniline (1.449 g, 1.418 mL, 15.56 mmol), and o-DCB (130 g). The flask was placed in an oil bath at 25° C., under nitrogen (15 scfh), agitated at 275 rpm, and began to heat to 60° C.

After 10 min the flask was charged with 3,3'-BPoDA (80.917 g, 169.1 mmol), 4,4'-DDS (20.033 g, 80.68 mmol), and o-DCB (284 g). The flask was agitated at 150 rpm and began to heat to 192° C. After 23 min agitation was reduced to 70 rpm throughout the glue ball stage, (173-180° C.). After the glue ball stage, agitation was increased to 275 rpm. After a total of 2 hr and 15 min, 175 g of distillate (o-DCB/H$_2$O) was removed from the Dean-Stark trap and the nitrogen flow was reduced to 0.5 scfh. The reaction became a homogenous yellow solution.

After a total of 5 hr and 10 min the heat was removed, the flask was diluted with additional o-DCB (117 g), allowed to cool with stirring to 80° C. The pre-polymer formed a large solid mass which was difficult to remove. The flask contents were then reheated to 185° C. then poured into a foil pan. A spatula was used to complete the transfer and air dried in the hood overnight. GPC analysis of a devolatilized sample indicated this material had an Mw of 22,395 g/mol. Hot-pressing provided a highly transparent yellow film with a Tg of 276° C.

Example 9

A 1000 mL 3-neck round-bottom flask equipped with a Dean-Stark trap, condenser, mechanical stirrer, and nitrogen inlet was charged with m-PD (8.700 g, 80.45 mmol), aniline (1.534 g, 1.501 mL, 16.47 mmol), and o-DCB (130 g). The flask was placed in an oil bath at 25° C., under nitrogen (15 scfh), agitated at 250 rpm, and began to heat to 60° C.

After 10 min the flask was charged with 3,3'-BPoDA (80.917 g, 169.1 mmol), 4,4'-DDS (19.976 g, 80.45 mmol), and o-DCB (284 g). The flask was agitated at 300 rpm and heated to 192° C. After a total of 62 min a biphasic mixture formed at 187° C. and agitation was reduced to 250 rpm. After a total of 2 hr and 15 min, 175 g of distillate (o-DCB/H$_2$O) was removed from the Dean-Stark trap and the nitrogen flow was reduced to 0.5 scfh. The reaction became a homogenous yellow solution.

After a total of 5 hr and 10 min the heat was removed, the flask was diluted with additional o-DCB (117 g), and allowed to cool with stirring to 80° C. The pre-polymer formed a large solid mass which was difficult to remove. The flask contents were then reheated to 185° C. then poured into a foil pan. A spatula was used to complete the transfer and air dried overnight. GPC analysis of a devolatilized sample indicated this material had an Mw of 21,989 g/mol. Hot-pressing provided a highly transparent yellow film with a Tg of 273° C.

Example 10

A 500 mL 3-neck round-bottom flask equipped with a Dean-Stark trap, condenser, mechanical stirrer, and nitrogen inlet was charged with 3,3'-BPoDA (55.33 g, 115.7 mmol), 4,4'-DDS (13.62 g, 54.87 mmol), m-PD (5.92 g, 54.75 mmol), aniline (1.11 g, 11.9 mmol), and o-DCB (287 g). The flask was placed in an oil bath at 25° C., under nitrogen (15 scfh), agitated at 200 rpm, and heated to 200° C. with 200 rpm agitation.

After 70 min, 61.2 g of distillate was removed from the trap and the nitrogen flow was reduced to 0.5 scfh. After a total heating time of 5 hr and 10 min, a biphasic mixture was observed. The contents of the flask were filtered through a Whatman #4 filter paper. The pre-polymer cake was devolatilized at 380° C. for 20 min. GPC analysis of this sample indicated this material had an Mw of 25,718 g/mol. Hot-pressing provided a highly transparent yellow film with a Tg of 276° C.

Example 11

A 500 mL 3-neck round-bottom flask equipped with a Dean-Stark trap, condenser, mechanical stirrer, and nitrogen inlet was charged with 3,3'-BPoDA (55.319 g, 115.6 mmol), 4,4'-DDS (12.658 g, 50.98 mmol), m-PD (6.738 g, 62.31 mmol), and o-DCB (279.7 g, 215 mL, 1903 mmol). The flask was placed in an oil bath at 25° C., under nitrogen (15 scfh), agitated at 200 rpm, and heated to 185° C. At 120° C. aniline (0.4361 g, 0.4267 mL, 4.683 mmol) was added.

After 20 min, agitation was reduced to 70 rpm throughout the glue ball stage, (163-179° C.). After the glue ball stage, agitation was increased to 200 rpm. After a total of 2 hr and 40 min, 116 g of distillate (o-DCB/H$_2$O) was removed from the Dean-Stark trap and the nitrogen flow was reduced to 0.5 scfh. The reaction became a homogenous yellow solution. After a total of 5 hr the flask was removed from the oil bath, diluted with additional o-DCB (78 g), and allowed to cool to ambient temperature, whereupon the mixture became a gum. o-DCB (78 g) was decanted off and the contents were reheated to 185° C. The yellow mixture was then quickly poured into a tin pan and cooled to ambient temperature. GPC analysis of a devolatilized sample indicated this material had an Mw of 30,204 g/mol. Hot-pressing provided a highly transparent creasable yellow film with a Tg of 279° C.

Example 12

A 1000 mL 3-neck round-bottom flask equipped with a Dean-Stark trap, condenser, mechanical stirrer, and nitrogen inlet was charged with m-PD (9.5968 g, 88.744 mmol), aniline (1.4504 g, 1.419 mL, 15.57 mmol), and o-DCB (130 g). The flask was placed in an oil bath at 25° C., under nitrogen (15 scfh), agitated at 250 rpm, and heated to 60° C.

After 15 min the flask was charged with 3,3'-BPoDA (80.917 g, 169.1 mmol), 4,4'-DDS (18.0288 g, 72.61 mmol), and o-DCB (284 g). The flask was agitated at 300 rpm and heated to 192° C. After a total of 48 min slurry began to dissolve at 176° C. Agitation was reduced to 70 rpm throughout the glue ball stage at 186-187° C., after which agitation was increased to 300 rpm. After a total of 1 hour and 10 min, the reaction became a homogenous yellow solution. After a total of 1.5 hr, 175 g of distillate (o-DCB/H$_2$O) was removed from the Dean-Stark trap and the nitrogen flow was reduced to 0.5 scfh.

After a total of 4 hr and 15 min, the reaction became biphasic. After a total of 5 hr and 45 min the heat was removed and poured directly into a foil pan. The transfer was completed with the aid of a spatula to remove the hardening pre-polymer from the flask, then air dried in the hood overnight. GPC analysis of a devolatilized sample indicated this material had an Mw of 22,416 g/mol. Hot-pressing provided a highly transparent yellow film with a Tg of 278° C.

Example 13

A 500 mL 3-neck round-bottom flask equipped with a Dean-Stark trap, condenser, mechanical stirrer, and nitrogen inlet was charged with 3,3'-BPoDA (55.319 g, 115.6 mmol), 4,4'-DDS (11.098 g, 44.70 mmol), m-PD (7.250 g, 67.04 mmol), aniline (0.627 g, 0.614 mL, 6.73 mmol), and o-DCB (276 g, 212 mL, 1877.6 mmol). The flask was placed in an oil bath at 25° C., under nitrogen (15 scfh), agitated at 200 rpm, and heated to 185° C.

After 25 min, the glue ball stage (168-177° C.) was observed. After a total of 1 hour and 50 min, 111 g of distillate (o-DCB/H$_2$O) was removed from the Dean-Stark trap, the nitrogen flow was reduced to 0.5 scfh, and agitation was increased to 250 rpm. After an additional 35 min a second glue ball stage was observed, whereupon agitation was reduced to 200 rpm. After a total of 4 hr the reaction became a slurry and agitation was increased to 300 rpm. After total of 6 hr the flask was removed from the oil bath, diluted with additional o-DCB (78 g), and allowed to cool to ambient temperature. The faint yellow solids were filtered onto a medium-fritted glass funnel, then air dried overnight. GPC analysis of a devolatilized sample indicated this material had an Mw of 36,123 g/mol. Hot-pressing provided a transparent creasable yellow film with a Tg of 285° C.

Example 14

A 500 mL 3-neck round-bottom flask equipped with a Dean-Stark trap, condenser, mechanical stirrer, and nitrogen inlet was charged with 3,3'-BPoDA (55.319 g, 115.6 mmol), 4,4'-DDS (11.016 g, 44.37 mmol), m-PD (7.196 g, 66.54 mmol), aniline (0.879 g, 0.860 mL, 9.44 mmol), and o-DCB (276 g, 212 mL, 1877.6 mmol). The flask was placed in an oil bath at 25° C., under nitrogen (15 scfh), agitated at 200 rpm, and heated to 185° C.

After 20 min, agitation was reduced to 70 rpm throughout the glue ball stage, (168-177° C.). After the glue ball stage, agitation was increased to 200 rpm. After a total of 1 hour and 25 min, a second glue-ball stage was observed and 117 g of distillate (o-DCB/H$_2$O) was removed from the Dean-Stark trap and the nitrogen flow was reduced to 0.5 scfh. After an additional 2 hr, a yellow slurry was observed, and agitation was increased to 300 rpm. After a total of 4 hr and 5 min, the flask was removed from the oil bath, diluted with additional o-DCB (78 g), and allowed to cool to ambient temperature. The light-yellow solids were filtered onto a medium-fritted glass funnel, then air dried in the hood overnight. GPC analysis of a devolatilized sample indicated this material had an Mw of 33,731 g/mol. Hot-pressing provided a highly transparent creasable yellow film with a Tg of 281° C.

Example 15

A 500 mL 3-neck round-bottom flask equipped with a Dean-Stark trap, condenser, mechanical stirrer, and nitrogen inlet was charged with 3,3'-BPoDA (55.142 g, 115.3 mmol), m-PD (7.1735 g, 66.335 mmol), 4,4'-DDS (10.9807 g, 44.22 mmol), aniline (0.8765 g, 0.8576 mL, 9.412 mmol), and o-DCB (276 g, 212 mL, 1870 mmol). The flask was placed in an oil bath at 25° C., under nitrogen (15 scfh), agitated at 150 rpm, and heated to 192° C.

After 20 min, agitation was reduced to 70 rpm throughout the glue ball stage, (167-182° C.). After a total of 1 hour and 5 min 116 g of distillate (o-DCB/$H_2O$) was removed from the Dean-Stark trap, the nitrogen flow was reduced to 0.5 scfh, the reaction was cooled to 185° C., and agitation was increased to 300 rpm. At this point, the mixture was a homogenous yellow solution. After a total of 1 hour and 35 min, the mixture developed a solid precipitate. After an additional 45 min, a second glue-ball stage was observed. After a total of 4 hr and 50 min, additional o-DCB (40 mL) was added, the mixture was heated to 192° C., and the nitrogen flow was increased to 15 scfh. After 30 min, 40 mL of distillate (o-DCB/$H_2O$) was drained from the trap, the nitrogen flow was reduced to 0.5 scfh, and the reaction was cooled to 185° C. At this point the mixture was a filterable slurry. After heating overnight, the flask contents were poured directly into an aluminum foil pan and allowed to cool to ambient temperature. GPC analysis of a devolatilized sample indicated this material had an Mw of 30,716 g/mol. Hot-pressing provided a highly transparent yellow film with a Tg of 281° C.

Example 16

A 500 mL 3-neck round-bottom flask equipped with a Dean-Stark trap, condenser, mechanical stirrer, and nitrogen inlet was charged with 3,3'-BPoDA (55.319 g, 115.6 mmol), 4,4'-DDS (10.956 g, 44.12 mmol), m-PD (7.157 g, 66.18 mmol), aniline (0.991 g, 0.970 mL, 10.6 mmol), and o-DCB (277 g, 213 mL, 1884.4 mmol). The flask was placed in an oil bath at 25° C., under nitrogen (15 scfh), agitated at 200 rpm, and heated to 185° C.

After fifteen min, agitation was reduced to 70 rpm throughout the glue ball stage, (168-177° C.). After the glue ball stage, agitation was increased to 200 rpm. After a total of 2 hr and 5 min the reaction developed a yellow precipitate. After an additional 40 min, 114 g of distillate (o-DCB/$H_2O$) was removed from the Dean-Stark trap, the nitrogen flow was reduced to 0.5 scfh, and solids were scraped off the sides of the flask. After a total of 5 hr and 45 minute the flask was removed from the oil bath, diluted with additional o-DCB (78 g), and allowed to cool to ambient temperature. The white solids were filtered onto a medium-fritted glass funnel, then air dried overnight. GPC analysis of a devolatilized sample indicated this material had an Mw of 29,803 g/mol. Hot-pressing provided a highly transparent yellow film with a Tg of 277° C.

Example 17

A 1000 mL 3-neck round-bottom flask equipped with a Dean-Stark trap, condenser, mechanical stirrer, and nitrogen inlet was charged with 3,3'-BPoDA (80.645 g, 168.6 mmol), 4,4'-DDS (17.5499 g, 70.68 mmol), m-PD (11.4650 g, 106.02 mmol), PA (2.408 g, 16.26 mmol), and o-DCB (408 g, 314 mL, 2775.5 mmol). The flask was placed in an oil bath at 25° C., under nitrogen (15 scfh), agitated at 300 rpm, and heated to 192° C.

The reaction mixture became viscous at 165° C., but no glue ball stage was observed. After a total of 1 hour and 25 min, 176 g of distillate (o-DCB/$H_2O$) was removed from the Dean-Stark trap, the nitrogen flow was reduced to 0.5 scfh, and the oil bath temperature was reduced to 185° C. The reaction became a cloudy yellow solution. After a total of 3 hr a glue ball stage was observed, during which agitation was decreased to 200 rpm. Additional o-DCB (130 g) was added to the flask, the temperature was increased to 192° C., the nitrogen flow was increased (15 scfh), and agitation was increased to 300 rpm. The glue ball broke up within a few min and after a total of 4 hr 130 g of distillate was removed from the Dean-Stark trap. The nitrogen flow was reduced to 0.5 scfh and the oil bath temperature was reduced to 185° C.

After a total of 4 hr and 50 min the flask was removed from the oil bath, diluted with additional o-DCB (117 g), and allowed to cool to 40° C. The light-yellow solids were filtered onto a fine-fritted glass funnel, then air dried overnight. GPC analysis of a devolatilized sample indicated this material had an Mw of 24,614 g/mol. Hot-pressing provided a highly transparent yellow film with a Tg of 276° C.

Example 18

A 500 mL 3-neck round-bottom flask equipped with a Dean-Stark trap, condenser, mechanical stirrer, and nitrogen inlet was charged with 3,3'-BPoDA (55.319 g, 115.6 mmol), 4,4'-DDS (9.639 g, 38.82 mmol), m-PD (7.7961 g, 72.093 mmol), and o-DCB (274 g, 211 mL, 1863.9 mmol). The flask was placed in an oil bath at 25° C., under nitrogen (15 scfh), agitated at 200 rpm, and began to heat to 185° C. At 120° C., aniline was added (0.879 g, 0.860 mL, 9.44 mmol).

After 20 min, agitation was reduced to 70 rpm throughout the glue ball stage, (163-180° C.). After the glue ball stage, agitation was increased to 200 rpm. After a total of 2 hr and 30 min, 116 g of distillate (o-DCB/$H_2O$) was removed from the Dean-Stark trap, the nitrogen flow was reduced to 0.5 scfh, and agitation was increased to 300 rpm. The reaction became a yellow slurry. After a total of 5 hr the flask was removed from the oil bath, diluted with additional o-DCB (78 g), and allowed to cool to ambient temperature. The solids were filtered onto a fine-fritted glass funnel, then air dried overnight. GPC analysis of a devolatilized sample indicated this material had an Mw of 30,328 g/mol. Hot-pressing provided a highly transparent yellow film with a Tg of 272° C.

Example 19

A 250 mL 3-neck round-bottom flask equipped with a Dean-Stark trap, condenser, mechanical stirrer, and nitrogen inlet was charged with 3,3'-BPoDA (21.53 g, 45.00 mmol), PA (0.79 g, 5.30 mmol), m-PD (4.08 g, 37.7 mmol), 4,4'-DDS (2.34 g, 9.42 mmol), and o-DCB (81.9 mL). The flask was placed in an oil bath at 25° C., under nitrogen (15 scfh), agitated at 200 rpm, and heated to 200° C.

After 30 min the mixture became homogenous and agitation was increased to 250 rpm. After an additional 25 min, the temperature reached 199° C. and a slurry was observed. After a total of 90 min, 33.03 g of distillate (o-DCB/$H_2O$) was removed from the Dean-Stark trap and the nitrogen flow was reduced to 0.5 scfh.

After a total of 8 hr and 10 min, additional m-PD (0.0576 g), 4,4'-DDS (0.0331 g) and PA (0.0112 g) were added with o-DCB (7.6 g) based on the stoichiometric analysis of a reaction sample. The polymerization was allowed to heat overnight. The following morning, additional 3,3'-BPoDA (0.256 g) was added, based on the stoichiometric analysis of a reaction sample. After an additional 3 hr, the flask containing a biphasic mixture was removed from the oil bath, allowed to cool to ambient temperature, then air dried overnight. GPC analysis of a devolatilized sample indicated this material had an Mw of 25,983 g/mol. Hot-pressing provided a highly transparent yellow film with a Tg of 262° C.

Example 20

A 1000 mL 3-neck round-bottom flask equipped with a Dean-Stark trap, condenser, mechanical stirrer, and nitrogen inlet was charged with 3,3'-BPoDA (58.00 g, 100 mass %, 121.23 mmol), p-PD (9.0138 g, 100 mass %, 83.35 mmol), 4,4'-ODA (7.1531 g, 100 mass %, 35.72 mmol), aniline (0.6560 g, 100 mass %, 0.6418 mL, 7.04 mmol), and o-DCB (277 g, 100 mass %, 214 mL). The flask was placed in an oil bath at 25° C., purged with nitrogen (15 scfh), agitated at 200-220 rpm, and heat to 185-190° C.

The reaction was concentrated to 30% solids by removing 118 g of distillate (oDCB/H$_2$O) from the Dean-Stark trap. The reaction formed a yellow slurry. After a total of 13 hr, the flask was removed from the oil bath, diluted with additional o-DCB (75 g), and allowed to cool to ambient temperature. The yellow solids were filtered using Whatman filter paper 4, then air dried in the hood overnight. GPC analysis of a devolatilized sample indicated this material had an Mw of 67,904. The hot-pressing using the Carver auto press provided a transparent creasable yellow film with a Tg of 280° C.

Example 21

A 1000 mL 3-neck round-bottom flask equipped with a Dean-Stark trap, condenser, mechanical stirrer, and nitrogen inlet was charged with 3,3'-BPoDA (50.00 g, 100 mass %, 104.51 mmol), p-PD (9.61 g, 100 mass %, 88.93 mmol), 4,4'-ODA (1.98 g, 100 mass %, 9.93 mmol), aniline (1.05 g, 100 mass %, 11.29 mmol), and o-DCB (231 g, 100 mass %, 178 mL). The flask was placed in an oil bath at 25° C., purged with nitrogen (15 scfh), agitated at 220 rpm, and heat to 185° C.

The reaction mixture was concentrated to 30% solids by removing 105 g of distillate (oDCB/H$_2$O). The reaction was stirred for 14 hr, then allowed to cool to ambient temperature. The yellow solids were filtered using Whatman filter paper 4, then air dried in the hood overnight. The hot-pressing using the Carver auto press provided an infusible powder with a Tg of 276° C.

Example 22

A 1000 mL 3-neck round-bottom flask equipped with a Dean-Stark trap, condenser, mechanical stirrer, and nitrogen inlet was charged with 3,3'-BPoDA (65.00 g, 100 mass %, 135.87 mmol), p-PD (3.15 g, 100 mass %, 29.21 mmol), 4,4'-ODA (23.26 g, 100 mass %, 116.17 mmol), PA (3.109 g, 100 mass %, 20.99 mmol), and o-DCB (341 g, 100 mass %, 262 mL). The flask was placed in an oil bath at 25° C., purged with nitrogen (15 scfh), agitated at 220 rpm, and heated to 185° C.

The reaction mixture was concentrated to 30% solids by removing 150 g of distillate (oDCB/H$_2$O) from the Dean-Stark trap. The reaction was stirred for 15 hr. then allowed to cool to ambient temperature. The yellow solids were filtered using Whatman filter paper 4, then air dried in the hood overnight. GPC analysis of a devolatilized sample indicated this material had an Mw of 38,349. The hot-pressing using the Carver auto press provided a transparent, highly creasable yellow film with a Tg of 259° C.

Example 23

A 1000 mL 3-neck round-bottom flask equipped with a Dean-Stark trap, condenser, mechanical stirrer, and nitrogen inlet was charged with 3,3'-BPoDA (65.00 g, 100 mass %, 135.87 mmol), p-PD (4.71 g, 100 mass %, 43.61 mmol), 4,4-ODA (20.35 g, 100 mass %, 101.63 mmol), PA (3.10 g, 100 mass %, 20.99 mmol), and o-DCB (335 g, 100 mass %, 259 mL). The flask was placed in a boil bath at 25° C., purged with nitrogen (15 scfh), agitated at 220 rpm, and heated to 185° C.

The reaction mixture was concentrated to 30% solids by removing 147 g of distillate (oDCB/H$_2$O) from the Dean-Stark trap. The reaction was stirred for 14 hr, then allowed to cool to ambient temperature. The yellow solids were filtered using Whatman filter paper 4, then air dried in the hood overnight. GPC analysis of a devolatilized sample indicated this material had an Mw of 42,954. The hot-pressing using the Carver auto press provided a transparent, highly creasable yellow film with a Tg of 265° C.

Example 24

A 1000 mL 3-neck round-bottom flask equipped with a Dean-Stark trap, condenser, mechanical stirrer, and nitrogen inlet was charged with 3,3'-BPoDA (50.00 g, 100 mass %, 104.51 mmol), p-PD (5.19 g, 100 mass %, 48.09 mmol), 4,4-ODA (11.99 g, 100 mass %, 59.89 mmol), PA (1.29 g, 100 mass %, 8.73 mmol), and o-DCB (250 g, 100 mass %, 192 mL). The flask was placed in an oil bath at 25° C., purged with nitrogen (15 scfh), agitated at 200-225 rpm, and heated to 185-190° C.

The reaction mixture was concentrated to 30% solids by removing 109 g of distillate (oDCB/H$_2$O) from the Dean-Stark trap. The reaction was stirred for 12 hr, then allowed to cool to ambient temperature. The yellow solids were filtered using Whatman filter paper 4, and air dried in a hood overnight. GPC analysis of a devolatilized sample indicated the material had an Mw of 70,717 g/mol. Hot-pressing using a Carver auto press provided a transparent creasable yellow film with a Tg of 278° C.

Example 25

A 1000 mL 3-neck round-bottom flask equipped with a Dean-Stark trap, condenser, mechanical stirrer, and nitrogen inlet was charged with 3,3'-BPoDA (50.00 g, 100 mass %, 104.51 mmol), p-PD (5.32 g, 100 mass %, 49.23 mmol), 4,4-ODA (12.25 g, 100 mass %, 61.22 mmol), PA (2.02 g, 100 mass %, 13.59 mmol), and o-DCB (252 g, 100 mass %, 193 mL). The flask was placed in an oil bath at 25° C., purged with nitrogen (15 scfh), agitated at 200-225 rpm, and heated to 185-190° C.

The reaction mixture was concentrated to 30% solids by removing 110 g of distillate (oDCB/H$_2$O) from the Dean-Stark trap. The reaction was stirred for 12 hr, then allowed to cool to ambient temperature. The yellow solids were filtered using Whatman filter paper 4, then air dried in the hood overnight. GPC analysis of a devolatilized sample indicated this material had an Mw of 76,398. The hot-pressing using the Carver auto press provided a transparent creasable yellow film with a Tg of 276° C.

Example 26

A 1000 mL 3-neck round-bottom flask equipped with a Dean-Stark trap, condenser, mechanical stirrer, and nitrogen inlet was charged with 3,3'-BPoDA (50.00 g, 100 mass %, 104.51 mmol), p-PD (5.26 g, 100 mass %, 48.70 mmol), 4,4-ODA (12.11 g, 100 mass %, 60.51 mmol), PA (1.67 g, 100 mass %, 11.28 mmol), and o-DCB (250 g, 100 mass %, 192 mL). The flask was placed in an oil bath at 25° C., purged with nitrogen (15 scfh), agitated at 210-225 rpm, and heated to 185-190° C.

The reaction mixture was concentrated to 30% solids by removing 110 g of distillate (oDCB/H$_2$O) from the Dean-Stark trap. The reaction was stirred for 12-13 hr, then allowed to cool to ambient temperature. The yellow solids were filtered using Whatman filter paper 4, then air dried in the hood overnight. GPC analysis of a devolatilized sample indicated this material had an Mw of 80,996. The hot-pressing using the Carver auto press provided a transparent creasable yellow film with a Tg of 278° C.

Example 27

A 1000 mL 3-neck round-bottom flask equipped with a Dean-Stark trap, condenser, mechanical stirrer, and nitrogen inlet was charged with 3,3'-BPoDA (50.00 g, 100 mass %, 114.96 mmol), p-PD (6.58 g, 100 mass %, 60.93 mmol), 4,4-ODA (12.20 g, 100 mass %, 60.93 mmol), PA (2.04 g, 100 mass %, 13.80 mmol), and o-DCB (250 g, 100 mass %, 192 mL). The flask was placed in an oil bath at 25° C., purged with nitrogen (15 scfh), agitated at 210-220 rpm, and heated to 185-190° C.

The reaction mixture was concentrated to 30% solids by removing 90 g of distillate (oDCB/H$_2$O) from the Dean-Stark trap. The reaction was stirred for 12 hr, then allowed to cool to ambient temperature. The yellow solids were filtered using Whatman filter paper 4, then air dried in the hood overnight. GPC analysis of a devolatilized sample indicated this material had an Mw of 42,438. The hot-pressing using the Carver auto press provided a transparent creasable light amber colored film with a Tg of 273° C.

Example 28

A 500 mL 3-neck round-bottom flask equipped with a Dean-Stark trap, condenser, mechanical stirrer, and nitrogen inlet was charged with 3,3'-BPoDA (53.996 g, 112.9 mmol), p-PD (6.397 g, 59.15 mmol), 4,4'-ODA (11.845 g, 59.154 mmol), PA (2.075 g, 14.01 mmol), and o-DCB (205 g, 158 mL). The flask was placed in an oil bath at 25° C., under nitrogen (15 scfh), agitated at 150 rpm, and heated to 192° C.

After 20 min, the glue ball stage (170-178° C.) was observed. After an additional six min, the reaction became homogenous and then lots of precipitate developed to make a fine yellow slurry. After a total of 1 hour and 35 min, 46.7 g of distillate (o-DCB/H$_2$O) was removed from the Dean-Stark trap, the nitrogen flow was reduced to 0.5 scfh, and the reaction was agitated at 250 rpm while cooling to 185° C. After a total of six hr and 5 min the pre-polymer solids were collected by filtration onto a medium fritted glass funnel, rinsing with o-DCB (60 mL). The solids were dried further overnight. GPC analysis of a devolatilized sample indicated this material had an Mw of 28,622 g/mol. Hot-pressing provided a highly transparent yellow film with a Tg of 269° C.

Example 29

A 1000 mL 3-neck round-bottom flask equipped with a Dean-Stark trap, condenser, mechanical stirrer, and nitrogen inlet was charged with 3,3'-BPoDA (53.691 g, 112.2 mmol), p-PD (6.397 g, 59.15 mmol), 4,4'-ODA (11.845 g, 59.154 mmol), PA (2.261 g, 15.26 mmol), and o-DCB (205 g, 158 mL). The flask was placed in an oil bath at 25° C., under nitrogen (15 scfh), agitated at 150 rpm, and heated to 192° C.

After 30 min, the glue ball stage was observed (157-173° C.). After the glue ball stage, the mixture became a homogenous orange-yellow solution. After a total of 55 min, 46.7 g of distillate (o-DCB/H$_2$O) was removed from the Dean-Stark trap, the nitrogen flow was reduced to 0.5 scfh, and the reaction was agitated at 250 rpm while cooling to 185° C. The reaction became a yellow slurry. After a total of six hr and 15 min the pre-polymer solids were collected by filtration onto a medium fritted glass funnel, rinsing with o-DCB (120 mL). The solids were dried further overnight. GPC analysis of a devolatilized sample indicated this material had an Mw of 35,237 g/mol. Hot-pressing provided a highly transparent yellow film with a Tg of 270° C.

Example 30

A 1000 mL 3-neck round-bottom flask equipped with a Dean-Stark trap, condenser, mechanical stirrer, and nitrogen inlet was charged with 3,3'-BPoDA (55 g, 114.96 mmol), p-PD (7.22 g, 66.79 mmol), 4,4'-ODA (11.02 g, 55.07 mmol), PA (2.04 g, 13.80 mmol), and o-DCB (250 g, 192 mL). The flask was placed in an oil bath at 25° C., under nitrogen (15 scfh), agitated at 200-220 rpm, and heated to 190° C.

After 30 min, the glue ball stage was observed (157-173° C.). After the glue ball stage, the mixture became a homogenous orange-yellow solution. After a total of 55 min, 90 g of distillate (o-DCB/H$_2$O) was removed from the Dean-Stark trap, the nitrogen flow was reduced to 10 scfh, and the reaction was agitated at 250 rpm. The reaction became a yellow slurry. After a total of 12 hr, the pre-polymer solids were filtered using Whatman filter paper 4, then air dried in the hood overnight. GPC analysis of a devolatilized sample indicated this material had an Mw of 41,503 g/mol. Hot-pressing provided a highly transparent light amber colored film with a Tg of 274° C.

Example 31

A 500 mL 3-neck round-bottom flask equipped with a Dean-Stark trap, condenser, mechanical stirrer, and nitrogen inlet was charged with 3,3'-BPoDA (54.112 g, 113.1 mmol), p-PD (7.092 g, 65.58 mmol), 4,4'-ODA (10.745 g, 53.661 mmol), PA (2.279 g, 15.39 mmol), and o-DCB (205 g, 158 mL). The flask was placed in an oil bath at 25° C., under nitrogen (15 scfh), agitated at 150 rpm, and heated to 192° C.

After 26 min the glue ball stage (152-169° C.) was observed. After a total of 45 min, 46.7 g of distillate (o-DCB/H$_2$O) was removed from the Dean-Stark trap, the nitrogen flow was reduced to 0.5 scfh, and the reaction was agitated at 250 rpm while cooling to 185° C. The reaction became a yellow slurry. After a total of 7 hr and 45 min the pre-polymer solids were collected by filtration onto a medium fritted glass funnel, rinsing with o-DCB (60 mL). The solids were dried further overnight. GPC analysis of a devolatilized sample indicated this material had an Mw of 28.334 g/mol. Hot-pressing provided a highly transparent yellow film with a Tg of 271° C.

Example 32

A 500 mL 3-neck round-bottom flask equipped with a Dean-Stark trap, condenser, mechanical stirrer, and nitrogen inlet was charged with 3,3'-BPoDA (54.420 g, 113.8 mmol), p-PD (7.092 g, 65.58 mmol), 4,4'-ODA (10.745 g, 53.661 mmol), PA (2.091 g, 14.12 mmol), and o-DCB (205 g, 158 mL). The flask was placed in an oil bath at 25° C., under nitrogen (15 scfh), agitated at 150 rpm, and heated to 192° C.

After seventeen min the glue ball stage (168-176° C.) was observed. After a total of 35 min, 46.7 g of distillate (o-DCB/H$_2$O) was removed from the Dean-Stark trap, the nitrogen flow was reduced to 0.5 scfh, and the reaction was agitated at 250 rpm while cooling to 185° C. At this point, the reaction became a yellow slurry. After a total of 7 hr and 10 min the pre-polymer solids were collected by filtration onto a medium fritted glass funnel, rinsing with o-DCB (60 mL). The solids were dried further overnight. GPC analysis of a devolatilized sample indicated this material had an Mw of 35,324 g/mol. Hot-pressing provided a highly transparent yellow film with a Tg of 273° C.

Example 33

A 1000 mL 3-neck round-bottom flask equipped with a Dean-Stark trap, condenser, mechanical stirrer, and nitrogen inlet was charged with 3,3'-BPoDA (55 g, 114.96 mmol), p-PD (7.89 g, 73.00 mmol), 4,4'-ODA (9.78 g, 48.86 mmol), PA (2.04 g, 13.82 mmol), and o-DCB (250 g, 192 mL). The flask was placed in an oil bath at 25° C., under nitrogen (15 scfh), agitated at 200-210 rpm, and heated to 185-190° C.

After 30 min, the glue ball stage was observed (157-173° C.). After the glue ball stage, the mixture became a homogenous orange-yellow solution. After a total of 60 min, 90 g of distillate (o-DCB/H$_2$O) was removed from the Dean-Stark trap, the nitrogen flow was reduced to 10 scfh, and the reaction was agitated at 250 rpm. The reaction became a yellow slurry. After a total of 13 hr. the pre-polymer solids were filtered using Whatman filter paper 4, then air dried in the hood overnight. GPC analysis of a devolatilized sample indicated this material had an Mw of 37,906 g/mol. Hot-pressing provided a highly transparent light amber colored film with a Tg of 276° C.

Example 34

A 1000 mL 3-neck round-bottom flask equipped with a Dean-Stark trap, condenser, mechanical stirrer, and nitrogen inlet was charged with 3,3'-BPoDA (55.00 g, 114.96 mmol), p-PD (7.894 g, 73.00 mmol), PA (2.046 g, 13.82 mmol), and o-DCB (210 g, 160 mL). The flask was placed in an oil bath at 25° C., under nitrogen (15 scfh), agitated at 200-220 rpm, and heated to 185-190° C. After 30 min, 25 g of distillate (o-DCB/H$_2$O) was removed from the Dean-Stark trap, the nitrogen flow was reduced to 10 scfh, and the reaction was agitated at 250 rpm. At this point, the reaction formed a uniform yellow slurry. After a total of 60 min, 4,4'-ODA (9.78 g, 48.86 mmol) was added and the reaction was maintained at 185-190° C.

After an additional 45 min, 25 g of distillate (o-DCB/H$_2$O) was removed from the Dean-Stark trap, and the nitrogen flow was reduced to 10 scfh. At this point, the reaction mixture stayed as a uniform yellow slurry. After a total of 12 hr, the pre-polymer solids were collected by filtration using Whatman filter paper 4, then air dried in the hood overnight. GPC analysis of a devolatilized sample indicated this material had an Mw of 26,237 g/mol. The hot-pressing using the Carver auto press provided a hazy yellow film with a Tg of 276° C. and Tm of 421° C.

Example 35

A 1000 mL 3-neck round-bottom flask equipped with a Dean-Stark trap, condenser, mechanical stirrer, and nitrogen inlet was charged with 3,3'-BPoDA (55.00 g, 114.96 mmol), 4,4'-ODA (9.78 g, 48.86 mmol), PA (2.046 g, 13.82 mmol), and o-DCB (210 g, 160 mL). The flask was placed in an oil bath at 25° C., under nitrogen (15 scfh), agitated at 200-220 rpm, and heated to 185-190° C. After 30 min, 30 g of distillate (o-DCB/H$_2$O) was removed from the Dean-Stark trap, the nitrogen flow was reduced to 10 scfh, and the reaction was agitated at 250 rpm. At this point, the reaction formed an orange colored homogeneous solution. After a total of 60 min, p-PD (7.89 g, 73.00 mmol) was added and the reaction was maintained at 185-190° C.

After an additional 40 min 25 g of distillate (o-DCB/H$_2$O) was removed from the Dean-Stark trap, the nitrogen flow was reduced to 10 scfh. At this point, the reaction mixture turned into a uniform yellow slurry. After a total of 13 hr, the pre-polymer solids were collected by filtration using Whatman filter paper 4, then air dried in the hood overnight. GPC analysis of a devolatilized sample indicated this material had an Mw of 57,042 g/mol. The hot-pressing using the Carver auto press provided a highly transparent yellow film with a Tg of 269° C.

Example 36

A 500 mL 3-neck round-bottom flask equipped with a Dean-Stark trap, condenser, mechanical stirrer, and nitrogen inlet was charged with 3,3'-BPoDA (54.526 g, 114.0 mmol), p-PD (7.818 g, 72.30 mmol), 4,4'-ODA (9.651 g, 48.20 mmol), PA (2.398 g, 16.19 mmol), and o-DCB (205 g, 158 mL). The flask was placed in an oil bath at 135° C., under nitrogen (15 scfh), agitated at 135 rpm, and heated to 192° C.

After 55 min a glue ball stage (155-172° C.) was observed. After an additional 20 min 46.5 g of distillate (o-DCB/H$_2$O) was removed from the Dean-Stark trap, the nitrogen flow was reduced to 0.5 scfh, and the reaction was agitated at 300 rpm while cooling to 185° C. At this point, the reaction became a yellow slurry. After a total of 7 hr and 20 min the pre-polymer solids were collected by filtration onto a medium fritted glass funnel, rinsing with o-DCB (60 mL). The solids were dried further overnight. GPC analysis of a devolatilized sample indicated this material had an Mw of 30,060 g/mol. Hot-pressing provided a highly transparent yellow film with a Tg of 273° C.

Example 37

A 1000 mL 3-necked round-bottom flask equipped with a Dean-Stark trap, condenser, mechanical stirrer, and nitrogen inlet was charged with 3,3'-BPoDA (55.00 g, 100 mass %, 114.96 mmol), p-PD (8.55 g, 100 mass %, 79.10 mmol), ODA (8.56 g, 100 mass %, 42.77 mmol), PA (2.04 g, 100 mass %, 13.80 mmol), and o-DCB (250 g, 100 mass %, 192 mL). The flask was placed in an oil bath at 25° C., purged with nitrogen (15 scfh), agitated at 210-220 rpm, and heated to 185-190° C.

The reaction mixture was concentrated to 30% solids by removing 90 g of distillate (oDCB/H$_2$O). The reaction was stirred for 12 hr, then allowed to cool to ambient temperature. The light-yellow colored solids were filtered using Whatman filter paper 4, then air dried in the hood overnight. GPC analysis of a devolatilized sample indicated this material had an Mw of 32,631. The hot-pressing using the Carver auto press provided a transparent creasable light amber colored film with a Tg of 279° C.

Example 38

A 1000 mL 3-necked round-bottom flask equipped with a Dean-Stark trap, condenser, mechanical stirrer, and nitrogen inlet was charged with 3,3'-BPoDA (65.00 g, 100 mass %, 135.87 mmol), p-PD (9.85 g, 100 mass %, 91.17 mmol), ODA (9.85 g, 100 mass %, 49.18 mmol), PA (1.62 g, 100 mass %, 10.94 mmol), and o-DCB (314 g, 100 mass %, 241 mL). The flask was placed in an oil bath at 25° C., purged with nitrogen (15 scfh), agitated at 210-220 rpm, and heated to 185-190° C.

The reaction mixture was concentrated to 30% solids by removing 138 g of distillate (oDCB/$H_2O$). The reaction was stirred for 14 hr, then allowed to cool to ambient temperature. The yellow solids were filtered using Whatman filter paper 4, then air dried in the hood overnight. GPC analysis of a devolatilized sample indicated this material had an Mw of 61,085. The hot-pressing using the Carver auto press provided a highly creasable translucent yellow film with a Tg of 286° C.

Example 39

A 500 mL 3-necked round-bottom flask equipped with a Dean-Stark trap, condenser, mechanical stirrer, and nitrogen inlet was charged with 3,3'-BPoDA (50.00 g, 100 mass %, 104.51 mmol), p-PD (8.19 g, 100 mass %, 75.77 mmol), ODA (7.11 g, 100 mass %, 35.53 mmol), PA (2.03 g, 100 mass %, 13.75 mmol), and o-DCB (242 g, 100 mass %, 186 mL). The flask was placed in an oil bath at 25° C., purged with nitrogen (15 scfh), agitated at 215-220 rpm, and heated to 185-190° C.

The reaction mixture was concentrated to 30% solids by removing 105 g of distillate (oDCB/$H_2O$). The reaction was stirred for 17 hr, then allowed to cool to ambient temperature. The yellow solids were filtered using Whatman filter paper 4, then air dried in the hood overnight. GPC analysis of a devolatilized sample indicated this material had an Mw of 26,869. The hot-pressing using the Carver auto press provided a creasable yellow film with a Tg of 272° C.

Example 40

A 500 mL 3-necked round-bottom flask equipped with a Dean-Stark trap, condenser, mechanical stirrer, and nitrogen inlet was charged with 3,3'-BPoDA (50.00 g, 100 mass %, 104.51 mmol), p-PD (8.17 g, 100 mass %, 75.56 mmol), ODA (6.94 g, 100 mass %, 34.70 mmol), PA (1.76 g, 100 mass %, 11.91 mmol), and o-DCB (241 g, 100 mass %, 185 mL). The flask was placed in an oil bath at 25° C., purged with nitrogen (15 scfh), agitated at 200-220 rpm, and heated to 185-190° C.

The reaction mixture was concentrated to 30% solids by removing 105 g of distillate (oDCB/$H_2O$). The reaction was stirred for 17 hr. then allowed to cool to ambient temperature. The yellow solids were filtered using Whatman filter paper 4, then air dried in the hood overnight. GPC analysis of a devolatilized sample indicated this material had an Mw of 31,247. The hot-pressing using the Carver auto press provided a creasable yellow film with a Tg of 274° C.

Example 41

A 500 mL 3-neck round-bottom flask equipped with a Dean-Stark trap, condenser, mechanical stirrer, and nitrogen inlet was charged with 3,3'-BPoDA (50.00 g, 100 mass %, 104.51 mmol), p-PD (7.48 g, 100 mass %, 69.21 mmol), 4,4-ODA (5.92 g, 100 mass %, 29.61 mmol), aniline (1.05 g, 100 mass %, 11.29 mmol), and o-DCB (238 g, 100 mass %, 183 mL). The flask was placed in an oil bath at 25° C., purged with nitrogen (15 scfh), agitated at 200-220 rpm, and heated to 185-190° C.

The reaction mixture was concentrated to 30% solids by removing 105 g of distillate (oDCB/$H_2O$). The reaction was stirred for 14 hr. then allowed to cool to ambient temperature. The yellow solids were filtered using Whatman filter paper 4, then air dried in the hood overnight. GPC analysis of a devolatilized sample indicated this material had an Mw of 39,246. The hot-pressing using the Carver auto press provided a creasable yellow film with a Tg of 279° C.

Example 42

A 500 mL 3-neck round-bottom flask equipped with a Dean-Stark trap, condenser, mechanical stirrer, and nitrogen inlet was charged with 3,3'-BPoDA (50.00 g, 100 mass %, 104.51 mmol), p-PD (8.54 g, 100 mass %, 79.05 mmol), 4,4-ODA (3.95 g, 100 mass %, 19.76 mmol), aniline (1.05 g, 100 mass %, 11.29 mmol), and o-DCB (235 g, 100 mass %, 180 mL). The flask was placed in an oil bath at 25° C., purged with nitrogen (15 scfh), agitated at 210-215 rpm, and heated to 185-190° C.

The reaction mixture was concentrated to 30% solids by removing 105 g distillate (oDCB/$H_2O$). The reaction was stirred for 14 hr. then allowed to cool to ambient temperature. The yellow solids were filtered using Whatman filter paper 4, then air dried in the hood overnight. The hot-pressing using the Carver auto press provided an infusible powder with a Tg of 276° C.

Example 43

A 500 mL 3-neck round-bottom flask equipped with a Dean-Stark trap, condenser, mechanical stirrer, and nitrogen inlet was charged with 3,3'-BPoDA (52.0777 g, 108.9 mmol), m-PD (3.07626 g, 28.447 mmol), 4,4'-ODA (17.0887 g, 85.341 mmol), PA (1.9064 g, 12.871 mmol), and o-DCB (205 g, 158 mL, 1400 mmol). The flask was placed in an oil bath at 25° C., inerted with nitrogen (15 scfh), agitated at 150 rpm, and heated to 192° C.

After seventeen min, agitation was reduced to 70 rpm throughout the glue ball stage, (166-172° C.). After the glue ball stage, agitation was increased to 200 rpm. After a total of 30 min, 46.7 g of distillate (o-DCB/$H_2O$) was removed from the Dean-Stark trap, the nitrogen flow was reduced to 0.5 scfh, and the reaction was agitated at 300 rpm while cooling to 185° C. The reaction became a homogenous yellow solution. After an additional 7 hr and 5 min, the mixture was still homogenous. Additional o-DCB (50 mL) was added to the mixture, the temperature was increased to 192° C., and nitrogen flow was increased to 15 scfh. After an additional 15 min, 50 mL of distillate was removed from the Dean-Stark trap, nitrogen flow was reduced to 0.5 scfh, and the temperature was adjusted to 185° C. After a total of 23 hr and 30 min the flask was removed from the oil bath and the contents were poured into a pan to cool to ambient temperature. GPC analysis of a devolatilized sample indicated this material had an Mw of 38,254 g/mol. Hot-pressing provided a highly transparent creasable yellow film with a Tg of 261° C.

Example 44

A 500 mL 3-neck round-bottom flask equipped with a Dean-Stark trap, condenser, mechanical stirrer, and nitrogen inlet was charged with 3,3'-BPoDA (51.491 g, 107.6 mmol), m-PD (3.076 g, 28.44 mmol), 4,4'-ODA (17.089 g, 85.343 mmol), PA (2.265 g, 15.29 mmol), and o-DCB (205 g, 158 mL, 1400 mmol). The flask was placed in an oil bath at 135° C., under nitrogen (15 scfh), agitated at 150 rpm, and heated to 192° C.

After 50 min, agitation was reduced to 70 rpm throughout the glue ball stage, (166-172° C.). After the glue ball stage, agitation was increased to 300 rpm. After a total of 65 min, 46.5 g of distillate (o-DCB/H$_2$O) was removed from the Dean-Stark trap, the nitrogen flow was reduced to 0.5 scfh, and the reaction was agitated at 300 rpm while cooling to 185° C. The reaction became a homogenous yellow solution. After a total of 5 hr and 30 min the flask contents were poured directly into an aluminum pan and allowed to cool further overnight. GPC analysis of a devolatilized sample indicated this material had an Mw of 35,609 g/mol. Hot-pressing provided a highly transparent creasable yellow film with a Tg of 258° C.

Example 45

A 500 mL 3-neck round-bottom flask equipped with a Dean-Stark trap, condenser, mechanical stirrer, and nitrogen inlet was charged with 3,3'-BPoDA (54.10262 g, 113.1 mmol), m-PD (6.39175 g, 59.106 mmol), 4,4'-ODA (11.83544 g, 59.106 mmol), PA (1.98053 g, 13.3714 mmol), and o-DCB (205 g, 158 mL, 1400 mmol). The flask was placed in an oil bath at 25° C., under nitrogen (15 scfh), agitated at 150 rpm, and heated to 192° C.

After 31 min, agitation was reduced to 70 rpm throughout the glue ball stage, (155-173° C.). After the glue ball stage, agitation was increased to 200 rpm. After a total of 55 min, 46.7 g of distillate (o-DCB/H$_2$O) was removed from the Dean-Stark trap, the nitrogen flow was reduced to 0.5 scfh, and the reaction was agitated at 300 rpm while cooling to 185° C. The reaction became a homogenous yellow solution. After an additional 7 hr and 30 min, the mixture was still homogenous. Additional o-DCB (50 mL) was added to the mixture, the temperature was increased to 192° C., and nitrogen flow was increased to 15 scfh. After an additional 15 min, 50 mL of distillate was removed from the Dean-Stark trap, nitrogen flow was reduced to 0.5 scfh, and the temperature was adjusted to 185° C. After a total of 23 hr and 45 min the flask was removed from the oil bath and the contents were poured into a pan to cool to ambient temperature. GPC analysis of a devolatilized sample indicated this material had an Mw of 36,349 g/mol. Hot-pressing provided a highly transparent creasable yellow film with a Tg of 262° C.

Example 46

A 250 mL 3-neck round-bottom flask equipped with a Dean-Stark trap, condenser, mechanical stirrer, and nitrogen inlet was charged with 3,3'-BPoDA (21.31 g, 44.55 mmol), m-PD (3.028 g, 28.00 mmol), 4,4'-ODA (3.738 g, 18.67 mmol), PA (0.776 g, 5.239 mmol), and o-DCB (112 g). The flask was placed in an oil bath at 25° C., under nitrogen (15 scfh), agitated at 150 rpm, and heated to 150° C.

After 1 hour, the set temperature was reached and a dough-like ball of solids was observed. Next, the oil bath was heated to 200° C. After an additional 1 hour and 45 min, the mixture became an opaque biphasic reaction. Heating was continued overnight, whereupon the pre-polymer solids stuck to the stir blade and shaft. After a total heating time of 20.5 hr, the contents were poured into a pan to cool to ambient temperature. GPC analysis of a devolatilized sample indicated this material had an Mw of 41,337 g/mol. Hot-pressing provided a highly transparent yellow film with a Tg of 261° C.

Example 47

A 250 mL 3-neck round-bottom flask equipped with a Dean-Stark trap, condenser, mechanical stirrer, and nitrogen inlet was charged with 3,3'-BPoDA (21.53 g, 44.00 mmol), m-PD (3.569 g, 33.00 mmol), 4,4'-ODA (2.832 g, 14.14 mmol), PA (0.784 g, 5.29 mmol), and o-DCB (122 g). The flask was placed in an oil bath at 25° C., under nitrogen (15 scfh), agitated at 150 rpm, and heated to 150° C.

After 1 hour, the set temperature was reached and a dough-ball stage was observed. Next, the oil bath was heated to 200° C. After an additional 1 hour and 45 min, the mixture became an opaque biphasic reaction. Heating was continued over 2 days, whereupon the pre-polymer solids stuck to the stir blade and shaft. Additional 3,3'-BPoDA (0.568 g) was added with o-DCB (10 g). The polymerization was heated for another 2 hr, then the contents were poured into a pan to cool to ambient temperature. GPC analysis of a devolatilized sample indicated this material had an Mw of 37,800 g/mol. Hot-pressing provided a highly transparent yellow film with a Tg of 2610° C.

Example 48

A 500 mL 3-neck round-bottom flask equipped with a Dean-Stark trap, condenser, mechanical stirrer, and nitrogen inlet was charged with 3,3'-BPoDA (56.29143 g, 117.7 mmol), m-PD (9.97551 g, 92.246 mmol), 4,4'-ODA (6.15713 g, 30.749 mmol), PA (2.06065 g, 13.9123 mmol), and o-DCB (205 g, 158 mL, 1400 mmol). The flask was placed in an oil bath at 25° C., under nitrogen (15 scfh), agitated at 150 rpm, and heated to 192° C.

After 15-25 min, agitation was reduced to 70 rpm throughout the glue ball stage, (166-172° C.). After the glue ball stage, agitation was increased to 200 rpm. After a total of 30 min, 46.7 g of distillate (o-DCB/H$_2$O) was removed from the Dean-Stark trap, the nitrogen flow was reduced to 0.5 scfh, and the reaction was agitated at 300 rpm while cooling to 185° C. The reaction became a homogenous yellow solution. After a total of 1 hour and 40 min, the mixture developed a pre-polymer precipitate. Additional o-DCB (20 mL) was added to the mixture, the temperature was increased to 192° C., and nitrogen flow was increased to 15 scfh. After an additional 15 min, 20 mL of distillate was removed from the Dean-Stark trap, nitrogen flow was reduced to 0.5 scfh, and the temperature was adjusted to 185° C. After a total of six hr and 30 min the solids were collected on a medium fritted glass funnel, rinsing with o-DCB (60 mL). The solids were dried further in a fume hood overnight. GPC analysis of a devolatilized sample indicated this material had an Mw of 34,839 g/mol. Hot-pressing provided a highly transparent creasable yellow film with a Tg of 266° C.

Example 49

A 500 mL 3-neck round-bottom flask equipped with a Dean-Stark trap, condenser, mechanical stirrer, and nitrogen inlet was charged with 3,3'-BPoDA (50.60 g, 105.8 mmol), 4,4'-DDS (14.95 g, 60.21 mmol), 4,4'-ODA (8.04 g, 40.2 mmol), aniline (1.02 g, 11.0 mmol), and o-DCB (280.30 g, 1906.8 mmol). The flask was placed in an oil bath at 25° C., under nitrogen (15 scfh), agitated at 70 rpm, and heated to 185° C.

After 35 min the glue ball stage, (170-180° C.) was observed. After the glue ball stage, agitation was increased to 200 rpm. After a total of 90 min, 113 g of distillate (o-DCB/$H_2O$) was removed from the Dean-Stark trap and the nitrogen flow was reduced to 0.5 scfh. The reaction became a homogenous yellow solution. After a total of 5 hr and 45 min the flask was removed from the oil bath, diluted with additional o-DCB (80 g), and allowed to cool to ambient temperature. The white solids were filtered onto a fine-fritted glass funnel, then air dried in the hood overnight. GPC analysis of a devotalized sample indicated this material had an Mw of 38,191 g/mol. The hot-pressing provided a highly transparent creasable yellow film with a Tg of 279° C.

Example 50

A 500 mL 3-neck round-bottom flask equipped with a Dean-Stark trap, condenser, mechanical stirrer, and nitrogen inlet was charged with 3,3'-BPoDA (50.372 g, 105.3 mmol), 4,4'-DDS (13.792 g, 55.55 mmol), 4,4'-ODA (9.100 g, 45.45 mmol), aniline (0.801 g, 0.784 mL, 8.60 mmol), and o-DCB (277 g, 213 mL, 1884.4 mmol). The flask was placed in an oil bath at 25° C., under nitrogen (15 scfh), agitated at 200 rpm, and heated to 185° C.

After fifteen min, agitation was reduced to 70 rpm throughout the glue ball stage, (168-180° C.). After the glue ball stage, agitation was increased to 225 rpm. After a total of 1 hour the reaction mixture became a homogenous yellow solution. After an additional 45 min, 116 g of distillate (o-DCB/$H_2O$) was removed from the Dean-Stark trap and the nitrogen flow was reduced to 0.5 scfh. After a total of 2 hr and 30 min, the mixture developed a solid precipitate, whereupon agitation was increased to 250 rpm. After a total of 4 hr and 15 min the flask was removed from the oil bath, diluted with additional o-DCB (78 g), and allowed to cool to ambient temperature. The white solids were filtered onto a fine-fritted glass funnel, then air dried in the hood overnight. GPC analysis of a devotalized sample indicated this material had an Mw of 41,637 g/mol. Hot-pressing provided a highly transparent creasable yellow film with a Tg of 252° C.

Example 51

A 500 mL 3-neck round-bottom flask equipped with a Dean-Stark trap, condenser, mechanical stirrer, and nitrogen inlet was charged with 3,3'-BPoDA (50.60 g, 105.8 mmol), 4,4'-DDS (12.46 g, 50.18 mmol), 4,4'-ODA (10.05 g, 50.19 mmol), aniline (1.01 g, 0.988 mL, 10.8 mmol), and o-DCB (277.33 g, 213 mL, 1886.6 mmol). The flask was placed in an oil bath at 25° C., under nitrogen (15 scfh), agitated at 70 rpm, and heated to 185° C.

After 35 min the glue ball stage (170-180° C.) was observed. After the glue ball stage, agitation was increased to 200 rpm. After a total of 90 min, 113 g of distillate (o-DCB/$H_2O$) was removed from the Dean-Stark trap and the nitrogen flow was reduced to 0.5 scfh. The reaction became a homogenous yellow solution. After a total of 5 hr and 30 min the flask was removed from the oil bath, diluted with additional o-DCB (79 g), and allowed to cool to ambient temperature. The white solids were filtered onto a fine-fritted glass funnel, then air dried in the hood overnight. GPC analysis of a devotalized sample indicated this material had an Mw of 39,776 g/mol. Hot-pressing provided a transparent yellow film with a Tg of 277° C.

Example 52

A 500 mL 3-neck round-bottom flask equipped with a Dean-Stark trap, condenser, mechanical stirrer, and nitrogen inlet was charged with 3,3'-BPoDA (50.599 g, 105.8 mmol), 4,4'-DDS (12.526 g, 50.45 mmol), 4,4'-ODA (10.102 g, 50.449 mmol), aniline (0.907 g, 0.887 mL, 9.74 mmol), and o-DCB (277 g, 213 mL, 1884.4 mmol). The flask was placed in an oil bath at 25° C., under nitrogen (15 scfh), agitated at 200 rpm, and heated to 185° C.

After 20 min, agitation was reduced to 70 rpm throughout the glue ball stage, (170-180° C.). After the glue ball stage, agitation was increased to 200 rpm. After a total of 90 min, 113 g of distillate (o-DCB/$H_2O$) was removed from the Dean-Stark trap and the nitrogen flow was reduced to 0.5 scfh. The reaction became a homogenous yellow solution. After a total of 5 hr and 30 min the mixture became a slurry and the flask was removed from the oil bath, diluted with additional o-DCB (78 g), and allowed to cool to ambient temperature. The white solids were filtered onto a fine-fritted glass funnel, then air dried in the hood overnight. GPC analysis of a devotalized sample indicated this material had an Mw of 38,849 g/mol. Hot-pressing provided a highly transparent creasable yellow film with a Tg of 277° C.

Example 53

A 500 mL 3-neck round-bottom flask equipped with a Dean-Stark trap, condenser, mechanical stirrer, and nitrogen inlet was charged with 3,3'-BPoDA (50.372 g, 105.3 mmol), 4,4'-DDS (12.538 g, 50.50 mmol), 4,4'-ODA (10.111 g, 50.494 mmol), aniline (0.801 g, 0.784 mL, 8.60 mmol), and o-DCB (276 g, 212 mL, 1877.6 mmol). The flask was placed in an oil bath at 25° C., under nitrogen (15 scfh), agitated at 200 rpm, and heated to 185° C.

After 20 min, agitation was reduced to 70 rpm throughout the glue ball stage, (168-181° C.). After the glue ball stage, agitation was increased to 200 rpm. After a total of 2 hr, 116 g of distillate (o-DCB/$H_2O$) was removed from the Dean-Stark trap and the nitrogen flow was reduced to 0.5 scfh. The reaction became a homogenous yellow solution. After an additional hour and 15 min, the mixture developed a solid precipitate, whereupon agitation was increased to 300 rpm. After a total of 5 hr and 10 min the flask was removed from the oil bath, diluted with additional o-DCB (78 g), and allowed to cool to ambient temperature. The white solids were filtered onto a fine-fritted glass funnel, then air dried in the hood overnight. GPC analysis of a devotalized sample indicated this material had an Mw of 46,877 g/mol. The hot-pressing provided a highly transparent creasable yellow film with a Tg of 282° C.

Example 54

A 500 mL 3-neck round-bottom flask equipped with a Dean-Stark trap, condenser, mechanical stirrer, and nitrogen inlet was charged with 3,3'-BPoDA (50.387 g, 105.3 mmol), 4,4'-DDS (12.760 g, 51.39 mmol), 4,4'-ODA (10.290 g, 51.388 mmol), aniline (0.2711 g, 0.2653 mL, 2.911 mmol), and o-DCB (275.6 g, 212 mL, 1875 mmol). The flask was placed in an oil bath at 25° C., under nitrogen (15 scfh), agitated at 200 rpm, and heated to 185° C.

After 23 min, agitation was reduced to 70 rpm throughout the glue ball stage, (167-175° C.). After the glue ball stage, agitation was increased to 250 rpm. After a total of 1 hour and 3 min the reaction became a homogenous yellow solution, 116 g of distillate (o-DCB/$H_2O$) was removed from the Dean-Stark trap, and the nitrogen flow was reduced to 0.5 scfh. After a total of 2 hr, additional 3,3'-BPoDA (1.475 g, 3.08 mmol), aniline (0.316 g, 3.39 mmol), 4,4'-ODA (0.1991 g, 0.994 mmol), 4,4'-DDS (0.247 g, 0.995 mmol), and o-DCB (26 g) were charged into the reaction flask. After an additional 15 min, 38 g of distillate (o-DCB/$H_2O$) was removed from the Dean-Stark trap. After a total of 4 hr and 28 min, the opaque yellow mixture was removed from the oil bath, diluted with additional o-DCB (78 g), and allowed to cool to ambient temperature. The faint yellow solids were filtered onto a medium-fritted glass funnel, then air dried in the hood overnight. GPC analysis of a devolatilized sample indicated this material had an Mw of 56,566 g/mol, hot-pressing provided a transparent creasable yellow film with a Tg of 288° C.

Example 55

A 1000 mL 3-neck round-bottom flask equipped with a Dean-Stark trap, condenser, mechanical stirrer, and nitrogen inlet was charged with 3,3'-BPoDA (73.072 g, 152.7 mmol), 4,4'-DDS (19.8777 g, 80.06 mmol), 4,4'-ODA (16.0302 g, 80.055 mmol), PA (2.182 g, 14.73 mmol), and o-DCB (408 g, 314 mL, 2775.5 mmol). The flask was placed in an oil bath at 25° C., under nitrogen (15 scfh), agitated at 300 rpm, and heated to 192° C.

After 37 min, agitation was reduced to 70 rpm throughout the glue ball stage, (158-175° C.). After the glue ball stage, agitation was increased to 300 rpm. After a total of 2 hr and 15 min, 176 g of distillate (o-DCB/$H_2O$) was removed from the Dean-Stark trap, nitrogen flow was reduced to 0.5 scfh, and the oil bath temperature was reduced to 185° C. The reaction became a homogenous yellow solution. After a total of 5 hr and 15 min the flask was removed from the oil bath, diluted with additional o-DCB (117 g), and allowed to cool to 40° C. The light-yellow solids were filtered onto a fine-fritted glass funnel, then air dried in the hood overnight. GPC analysis of a devolatilized sample indicated this material had an Mw of 28,244 g/mol. Hot-pressing provided a highly transparent yellow film with a Tg of 273° C.

Example 56

A 500 mL 3-neck round-bottom flask equipped with a Dean-Stark trap, condenser, mechanical stirrer, and nitrogen inlet was charged with 3,3'-BPoDA (50.372 g, 105.3 mmol), 4,4'-DDS (11.284 g, 45.45 mmol), 4,4'-ODA (11.122 g, 55.543 mmol), aniline (0.801 g, 0.784 mL, 8.60 mmol), and o-DCB (275 g, 212 mL, 1870.7 mmol). The flask was placed in an oil bath at 25° C., under nitrogen (15 scfh), agitated at 200 rpm, and heated to 185° C.

After 25 min, agitation was reduced to 70 rpm throughout the glue ball stage, (168-181° C.). After the glue ball stage, agitation was increased to 200 rpm. After a total of 2 hr, 118 g of distillate (o-DCB/$H_2O$) was removed from the Dean-Stark trap and the nitrogen flow was reduced to 0.5 scfh. After a total of 3 hr and 5 min the reaction became a completely homogenous yellow solution and agitation was increased to 250 rpm. After a total of 5 hr and 10 min, the mixture developed a solid precipitate, whereupon agitation was increased to 300 rpm. After an additional 15 min the flask was removed from the oil bath, diluted with additional o-DCB (78 g), and allowed to cool to ambient temperature. The light-yellow solids were filtered onto a fine-fritted glass funnel, then air dried in the hood overnight. GPC analysis of a devolatilized sample indicated this material had an Mw of 41,623 g/mol. Hot-pressing provided a highly transparent creasable yellow film with a Tg of 261° C.

Example 57

A 1000 mL 3-neck round-bottom flask equipped with a Dean-Stark trap, condenser, mechanical stirrer, and nitrogen inlet was charged with 3,3'-BPoDA (65.00 g, 100 mass %, 135.87 mmol), p-PD (10.54 g, 100 mass %, 97.54 mmol), m-PD (3.46 g, 100 mass %, 32.00 mmol), aniline (1.16 g, 100 mass %, 12.51 mmol), and o-DCB (296 g, 100 mass %, 227 mL). The flask was placed in an oil bath at 25° C., purged with nitrogen (15 scfh), agitated at 220 rpm, and heated to 185° C.

The reaction mixture was concentrated to 30% solids by removing 130 g of distillate (oDCB/$H_2O$). The reaction was stirred for 14 hr, then allowed to cool to ambient temperature. The yellow solids were filtered using Whatman filter paper 4, then air dried in the hood overnight. Hot-pressing using the Carver auto press provided an infusible powder with a Tg of 278° C.

Example 58

A 1000 mL 3-neck round-bottom flask equipped with a Dean-Stark trap, condenser, mechanical stirrer, and nitrogen inlet was charged with 3,3'-BPoDA (65.00 g, 100 mass %, 135.87 mmol), p-PD (9.11 g, 100 mass %, 84.28 mmol), m-PD (4.89 g, 100 mass %, 45.24 mmol), aniline (1.16 g, 100 mass %, 12.47 mmol), and o-DCB (296 g, 100 mass %, 227 mL). The flask was placed in an oil bath at 25° C., purged with nitrogen (15 scfh), agitated at 220 rpm, and heated to 185° C.

The reaction mixture was concentrated to 30% solids by removing 130 g of distillate (oDCB/$H_2O$). The reaction was stirred for 14 hr, then allowed to cool to ambient temperature. The yellow solids were filtered using Whatman filter paper 4, then air dried in the hood overnight. GPC analysis of a devolatilized sample indicated this material had an Mw of 32,602. The hot-pressing using the Carver auto press provide a transparent film with a Tg of 276° C.

Example 59

A 1000 mL 3-neck round-bottom flask equipped with a Dean-Stark trap, condenser, mechanical stirrer, and nitrogen inlet was charged with 3,3'-BPoDA (50.00 g, 100 mass %, 104.51 mmol), p-PD (7.77 g, 100 mass %, 71.90 mmol), m-PD (4.24 g, 100 mass %, 39.30 mmol), PA (2.04 g, 100 mass %, 13.77 mmol), and o-DCB (229 g, 100 mass %, 176 mL). The flask was placed in an oil bath at 25° C., purged with nitrogen (15 scfh), agitated at 220 rpm, and heated to 185° C.

The reaction mixture was concentrated to 30% solids by removing 100 g of distillate (oDCB/$H_2O$). The reaction was stirred for 17 hr, then allowed to cool to ambient temperature. The yellow solids were filtered using Whatman filter paper 4, then air dried in the hood overnight. GPC analysis of a devolatilized sample indicated this material had an Mw of 22,539. The hot-pressing using the Carver auto press provided a yellow film with a Tg of 271° C.

Example 60

A 1000 mL 3-neck round-bottom flask equipped with Dean-Stark trap, condenser, mechanical stirrer, and nitrogen inlet was charged with 3,3'-BPoDA (50.00 g, 100 mass %, 104.51 mmol), p-PD (7.71 g, 100 mass %, 71.38 mmol), m-PD (4.20 g, 100 mass %, 38.88 mmol), PA (1.76 g, 100 mass %, 11.91 mmol), and o-DCB (228 g, 100 mass %, 175 mL). The flask was placed in an oil bath at 25° C., purged with nitrogen (15 scfh), agitated at 220 rpm, and heated to 185° C.

The reaction mixture was concentrated to 30% solids by removing 100 g of distillate (oDCB/H$_2$O). The reaction was stirred for 17 hr, then allowed to cool to ambient temperature. The yellow solids were filtered using Whatman filter paper 4, then air dried in the hood overnight. GPC analysis of a devolatilized sample indicated this material had an Mw of 24,831. The hot-pressing using the Carver auto press provided a yellow film with a Tg of 274° C.

Example 61

A 1000 mL 3-neck round-bottom flask equipped with a Dean-Stark trap, condenser, mechanical stirrer, and nitrogen inlet was charged with 3,3'-BPoDA (65.00 g, 100 mass %, 135.87 mmol), p-PD (7.01 g, 100 mass %, 64.85 mmol), m-PD (7.01 g, 100 mass %, 64.85 mmol), aniline (1.16 g, 100 mass %, 12.47 mmol), and o-DCB (296 g, 100 mass %, 227 mL). The flask was placed in an oil bath at 25° C., purged with nitrogen (15 scfh), agitated at 220 rpm, and heated to 185° C.

The reaction mixture was concentrated to 30% solids by removing 130 g of distillate (oDCB/H$_2$O). The reaction was stirred for 14 hr, then allowed to cool to ambient temperature. The yellow solids were filtered using Whatman filter paper 4, then air dried in the hood overnight. GPC analysis of a devolatilized sample indicated this material had an Mw of 33,676. The hot-pressing using the Carver auto press provided a transparent creasable yellow film with a Tg of 273° C.

Example 62

A 1000 mL 3-neck round-bottom flask equipped with a Dean-Stark trap, condenser, mechanical stirrer, and nitrogen inlet was charged with 3,3'-BPoDA (65.00 g, 100 mass %, 135.87 mmol), p-PD (4.61 g, 100 mass %, 42.68 mmol), m-PD (10.76 g, 100 mass %, 99.59 mmol), PA (2.21 g, 100 mass %, 14.93 mmol), and o-DCB (297 g, 100 mass %, 229 mL). The flask was placed in an oil bath at 25° C., purged with nitrogen (15 scfh), agitated at 200-220 rpm, and heated to 185-190° C.

After thirty min, agitation was reduced to 80 rpm throughout the glue ball stage, (155-180° C.). Once the glue ball stage is passed, agitation was increased to 220 rpm. And, the reaction mixture was then concentrated to 30% solids by removing 130 g of distillate (oDCB/H$_2$O) from the Dean-Stark trap. The reaction was stirred for 12 hr, then allowed to cool to ambient temperature. The yellow solids were filtered using Whatman filter paper 4, then air dried in the hood overnight. GPC analysis of a devolatilized sample indicated this material had an Mw of 36,233. The hot-pressing using the Carver auto press provided a transparent creasable light amber colored film with a Tg of 252° C.

Example 63

A 1000 mL 3-neck round-bottom flask equipped with a Dean-Stark trap, condenser, mechanical stirrer, and nitrogen inlet was charged with 3,3'-BPoDA (65.00 g, 100 mass %, 135.87 mmol), p-PD (3.84 g, 100 mass %, 35.60 mmol), m-PD (11.53 g, 100 mass %, 106.66 mmol), PA (2.21 g, 100 mass %, 14.93 mmol), and o-DCB (297 g, 100 mass %, 229 mL). The flask was placed in an oil bath at 25° C., purged with nitrogen (15 scfh), agitated at 200-220 rpm, and heated to 185-190° C.

After thirty min, agitation was reduced to 80 rpm throughout the glue ball stage, (155-180° C.). Once the glue ball stage is passed, agitation was increased to 220 rpm. And, the reaction mixture was then concentrated to 30% solids by removing 130 g of distillate (oDCB/H$_2$O) from the Dean-Stark trap. The reaction was stirred for 12 hr, then allowed to cool to ambient temperature. The yellow solids were filtered using Whatman filter paper 4, then air dried in the hood overnight. GPC analysis of a devolatilized sample indicated this material had an Mw of 40,097. The hot-pressing using the Carver auto press provided a transparent creasable yellow film with a Tg of 269° C.

Example 64

A 1000 mL 3-neck round-bottom flask equipped with a Dean-Stark trap, condenser, mechanical stirrer, and nitrogen inlet was charged with 3,3'-BPoDA (65.00 g, 100 mass %, 135.87 mmol), p-PD (3.07 g, 100 mass %, 28.40 mmol), m-PD (12.30 g, 100 mass %, 113.79 mmol), PA (2.21 g, 100 mass %, 14.93 mmol), and o-DCB (297 g, 100 mass %, 229 mL). The flask was placed in an oil bath at 25° C., purged with nitrogen (15 scfh), agitated at 220 rpm, and heated to 185° C.

After thirty min, agitation was reduced to 80 rpm throughout the glue ball stage, (155-180° C.). Once the glue ball stage is passed, agitation was increased to 220 rpm. And, the reaction mixture was then concentrated to 30% solids by removing 129 g of distillate (oDCB/H$_2$O) from the Dean-Stark trap. The reaction was stirred for 12 hr, then allowed to cool to ambient temperature. The yellow solids were filtered using Whatman filter paper 4, then air dried in the hood overnight. GPC analysis of a devolatilized sample indicated this material had an Mw of 32,156. The hot-pressing using the Carver auto press provided a transparent creasable pale amber film with a Tg of 271° C.

Example 65

A 1000 mL 3-neck round-bottom flask equipped with a Dean-Stark trap, condenser, mechanical stirrer, and nitrogen inlet was charged with 3,3'-BPoDA (50.00 g, 100 mass %, 104.51 mmol), p-PD (10.68 g, 100 mass %, 46.04 mmol), aniline (1.05 g, 100 mass %, 11.29 mmol), and m-cresol (228 g, 100 mass %, 221 mL). The flask was placed in an oil bath at 25° C., purged with nitrogen (15 scfh), agitated at 200-220 rpm, and heated to 190-200° C.

The reaction mixture turned from homogeneous light amber color to opaque yellowish orange. Another 200 g of m-cresol was added to facilitate good mixing. The reaction was stirred for 15-20 hr, then allowed to cool to ambient temperature. A small amount (2-3 g) of this opaque solution was devolatilized and the resultant material was hot-pressed using the Carter auto press to provide an infusible powder with a Tm greater than 450° C.

Example 66

A 1000 mL 3-neck bottom flask equipped with a Dean-Stark trap, condenser, mechanical stirrer, and nitrogen inlet was charged with 3,3'-BPoDA (75.00 g, 100 mass %, 156.77 mmol), p-PD (17.32 g, 100 mass %, 163.04 mmol), PA (2.26 g, 100 mass %, 15.29 mmol), and o-DCB (340 g, 100 mass %, 262 mL). The flask was placed in an oil bath at 25° C., purged with nitrogen (15 scfh), agitated at 200-220 rpm, and heated to 180-190° C.

The reaction mixture was concentrated to 30% solids by removing 150 g of distillate (oDCB/H$_2$O) from the Dean-Stark trap. The reaction provided a pale-yellow colored slurry, which was stirred for 16 hr. then allowed to cool to ambient temperature. The resultant solids were collected using a vacuum filter (Whatman filter paper 4), which were then air-dried in the hood overnight. GPC analysis of a devolatilized sample indicated this material had an Mw of 18,869. The hot-pressing using the Carver auto press provided an infusible powder with a Tm greater than 450° C.

Example 67

A 1000 mL 3-neck round-bottom equipped with a Dean-Stark trap, condenser, mechanical stirrer, and nitrogen inlet was charged with 3,3'-BPoDA (75.00 g, 100 mass %, 156.77 mmol), p-PD (17.44 g, 100 mass %, 161.31 mmol), PA (1.75 g, 100 mass %, 11.82 mmol), and o-DCB (341 g, 100 mass %, 262 mL). The flask was placed in an oil bath at 25° C., purged with nitrogen (15 scfh), agitated at 200-220 rpm, and heated to 185-195° C.

The reaction mixture was concentrated to 30% solids by removing 150 g of distillate (oDCB/H$_2$O) from the Dean-Stark trap. The reaction formed a pale-yellow colored slurry, which was stirred for 16 hr, then allowed to cool to ambient temperature. The pale-yellow solids were collected using a vacuum filter (Whatman filter paper 4), which were then air-dried in the hood overnight. GPC analysis of a devolatilized sample indicated this material had an Mw of 14,352. The hot-pressing using the Carver auto press provided an infusible powder with a Tm greater than 450° C.

Example 68

A 1000 mL 3-neck round-bottom flask equipped with a Dean-Stark trap, condenser, mechanical stirrer, and nitrogen inlet was charged with 3,3'-BPoDA (75.00 g, 100 mass %, 156.77 mmol), p-PD (17.32 g, 100 mass %, 160.22 mmol), PA (1.40 g, 100 mass %, 9.48 mmol), and o-DCB (341 g, 100 mass %, 262 mL). The flask was placed in an oil bath at 25° C., purged with nitrogen (15 scfh), agitated at 200-220 rpm, and heated to 185-190° C.

The reaction mixture was concentrated to 30% solids by removing 150 g of distillate (oDCB/H$_2$O) from the Dean-Stark trap. The reaction formed a pale-yellow colored slurry, which was stirred for 14 hr, then allowed to cool to ambient temperature. The solids were collected using a vacuum filter (Whatman filter paper 4), which were then air-dried in the hood overnight. GPC analysis of a devolatilized sample indicated this material had an Mw of 11,713. The hot-pressing using the Carver auto press provided an infusible powder with a Tm greater than 450° C.

Example 69

A 1000 mL 3-neck round-bottom flask equipped with a Dean-Stark trap, condenser, mechanical stirrer, and nitrogen inlet was charged with 3,3'-BPoDA (50.88 g, 100 mass %, 106.36 mmol), 4,4'-DDS (26.40 g, 100 mass %, 106.36 mmol), aniline (0.575 g, 100 mass %, 6.18 mmol), and o-DCB (330 g, 100 mass %, 252 mL). The flask was placed in an oil bath at 25° C., purged with nitrogen (15 scfh), agitated at 200-220 rpm, and heated to 185-190° C.

The reaction mixture was concentrated to 30% solids by removing 155 g of distillate (oDCB/H$_2$O) from the Dean-Stark trap. The reaction was stirred for a total of 13 hr forming a pale-yellow precipitate. Then, the flask was then removed from the oil bath, and diluted with additional o-DCB (70 g) and was allowed to cool to ambient temperature. The pale-yellow solids were collected using a vacuum filter (Whatman filter paper 4), which were then air-dried in the hood overnight. GPC analysis of a devolatilized sample indicated this material had an Mw of 19,958. The hot-pressing using the Carver auto press provided a transparent creasable amber colored film with a Tg of 288.3° C.

Example 70

A 1000 mL 3-neck round-bottom flask equipped with a Dean-Stark trap, condenser, mechanical stirrer, and nitrogen inlet was charged with 3,3'-BPoDA (50.884 g, 100 mass %, 106.36 mmol), DDS (26.40 g, 100 mass %, 106.36 mmol), octadecylamine (2.694 g, 100 mass %, 10.00 mmol) and o-DCB (290 g, 100 mass %, 223 mL). The flask was placed in an oil bath at 25° C., purged with nitrogen (15 scfh), agitated at 200-210 rpm, and heated to 185-190° C.

The reaction mixture was concentrated to 30% solids by removing 124 g of distillate (oDCB/H$_2$O). After a total of 12 hr, the reaction developed a pale-yellow precipitate. The flask was then removed from the oil bath and diluted with additional o-DCB (75 g) and allowed to cool to ambient temperature. The pale-yellow solids were collected using a vacuum filter (Whatman filter paper 4), which were then air-dried in the hood overnight. GPC analysis of a Haake sample indicated this material had an Mw of 19,799. The DSC measurement on Haake grinds afforded polymer with a Tg of 268.7° C., and the hot-pressing using the Carver auto press provided a transparent creasable amber colored film.

Example 71

A 500 mL 3-neck round-bottom flask equipped with a Dean-Stark trap, condenser, mechanical stirrer, and nitrogen inlet was charged with 3,3'-BPoDA (44.45 g, 92.91 mmol), 4,4'-ODPA (14.947 g, 48.19 mmol), m-PD (14.804 g, 136.90 mmol), aniline (0.6026 g, 0.5896 mL, 6.471 mmol), and o-DCB (274 g, 211 mL, 1863.9 mmol). The flask was placed in an oil bath at 25° C., under nitrogen (15 scfh), agitated at 200 rpm, and heated to 185° C.

After twelve min a glue ball stage (160-169° C.) was observed. After a total of 25 min a second glue-ball stage was observed (182-185° C.). After a total of 1 hour 119.6 g of distillate (o-DCB/H$_2$O) was removed from the Dean-Stark trap and the nitrogen flow was reduced to 0.5 scfh. After an additional 30 min, a yellow slurry was observed. After a total of 4 hr and 15 min, the flask was removed from the oil bath, diluted with additional o-DCB (78 g), and allowed to cool to ambient temperature. The light-yellow solids were filtered onto a medium-fritted glass funnel, then air dried overnight. GPC analysis of a devolatilized sample indicated this material had an Mw of 31,252 g/mol.

Hot-pressing provided a transparent yellow film with a Tg of 279° C.

Example 72

A 500 mL 3-neck round-bottom flask equipped with a Dean-Stark trap, condenser, mechanical stirrer, and nitrogen inlet was charged with 3,3'-BPoDA (44.45 g, 92.91 mmol), 4,4'-ODPA (15.271 g, 49.23 mmol), m-PD (14.81 g, 137.0 mmol), aniline (0.8776 g, 9.423 mmol), and o-DCB (276 g, 212 mL, 1877.6 mmol). The flask was placed in an oil bath at 25° C., under nitrogen (15 scfh), agitated at 250 rpm, and heated to 185° C.

After 22 min, agitation was reduced to 135 rpm throughout the glue ball stage, (152-167° C.). After the glue ball stage, agitation was increased to 200-350 rpm. After a total of 1 hour, 138 g of distillate (o-DCB/$H_2O$) was removed from the Dean-Stark trap, the nitrogen flow was reduced to 0.5 scfh, and agitation was increased to 400 rpm. The reaction became a viscous opaque yellow mixture. After a total of 1 hour and 45 min, the yellow slurry was agitated at 450 rpm. After a total of 4 hr an additional 52 g of distillate was drained from the Dean-Stark trap and the flask was removed from the oil bath, diluted with additional o-DCB (78 g), and allowed to cool to ambient temperature. The light-yellow solids were filtered onto a medium-fritted glass funnel, then dried in an oven at 180° C. overnight. GPC analysis of a devolatilized sample indicated this material had an Mw of 33,095 g/mol. Hot-pressing provided a transparent yellow film with a Tg of 275° C.

Example 73

A 500 mL 3-neck round-bottom flask equipped with a Dean-Stark trap, condenser, mechanical stirrer, and nitrogen inlet was charged with 3,3'-BPoDA (44.931 g, 93.92 mmol), 4,4'-ODPA (15.688 g, 50.57 mmol), m-PD (15 g, 138.71 mmol), aniline (1.0765 g, 11.56 mmol), and o-DCB (280.627 g, 216 mL, 1909.0 mmol). The flask was placed in an oil bath at 170° C., under nitrogen (15 scfh), agitated at 200 rpm, and heated to 185° C.

After 15 min, agitation was reduced to 70 rpm throughout the glue ball stage. After the glue ball stage, agitation was increased to 200 rpm. After a total of 65 min, 63.4 g of distillate (o-DCB/$H_2O$) was removed from the Dean-Stark trap and the mixture formed a large dough-like ball. After an additional 55 min, a spatula was used to break up the large mass to encourage better mixing, 132.3 g of distillate (o-DCB/$H_2O$) was removed from the Dean-Stark trap, the sides of the flask were rinsed down with additional o-DCB (36 g), and the nitrogen flow was reduced to 0.5 scfh. After a total of 23 hr the flask was removed from the oil bath, diluted with additional o-DCB (78 g), and allowed to cool to ambient temperature. The white solids were filtered onto a fine-fritted glass funnel, then oven dried at 180° C. overnight. GPC analysis of a devolatilized sample indicated this material had an Mw of 31,042 g/mol. Hot-pressing provided a transparent yellow film with a Tg of 272° C.

Example 74

A 500 mL 3-neck round-bottom flask equipped with a Dean-Stark trap, condenser, mechanical stirrer, and nitrogen inlet was charged with 3,3'-BPoDA (41.997 g, 87.78 mmol), 4,4'-ODPA (18.154 g, 58.52 mmol), m-PD (15.177 g, 140.35 mmol), aniline (1.111 g, 1.087 mL, 11.93 mmol), and o-DCB (279 g, 215 mL, 1898.0 mmol). The flask was placed in an oil bath at 25° C. under nitrogen (15 scfh), agitated at 200 rpm, and heated to 185° C.

After fifteen min, agitation was reduced to 70 rpm throughout the glue ball stage, (165-174° C.). After the glue ball stage, agitation was increased to 250 rpm. After a total of 45 min the reaction developed a second glue-ball stage, after which agitation was increased to 300 rpm. After an additional 90 min, 116 g of distillate (o-DCB/$H_2O$) was removed from the Dean-Stark trap and the nitrogen flow was reduced to 0.5 scfh. After a total of 4 hr and 5 minute the flask was removed from the oil bath, diluted with additional o-DCB (78 g), and allowed to cool to ambient temperature. The white solids were filtered onto a fine-fritted glass funnel, then air dried in the hood overnight. GPC analysis of a devolatilized sample indicated this material had an Mw of 24,190 g/mol. Hot-pressing provided a transparent yellow film with a Tg of 272° C.

Example 75

A 1000 mL 3-neck round-bottom flask equipped with a Dean-Stark trap, condenser, mechanical stirrer, and nitrogen inlet was charged with 3,3'-BPoDA (56.638 g, 100 mass %, 118.39 mmol), pyromellitic dianhydride (4.557 g, 100 mass %, 20.89 mmol), m-PD (14.735 g, 100 mass %, 136.26 mmol), aniline (0.8107 g, 100 mass %, 0.7932 mL, 8.71 mmol), and o-DCB (282 g, 100 mass %, 217 mL). The flask was placed in an oil bath at 25° C., purged with nitrogen (15 scfh), agitated at 210-220 rpm, and heated to 185-190° C.

The reaction mixture was concentrated to 30 wt % solids by removing 120 g of distillate (oDCB/H2O). After a total of 10 hr, the reaction formed a pale-yellow precipitate. The flask was then removed from the oil bath and diluted with additional o-DCB (75 g) and allowed to cool to ambient temperature. The pale-yellow solids were collected using a vacuum filter (Whatman filter paper 4), and then air-dried in the hood overnight. GPC analysis of a devolatilized sample indicated this material had an Mw of 24,880. The DSC measurement on Haake grinds afforded polymer with a Tg of 278° C., and the hot-pressing using the Carver auto press provided a transparent creasable amber colored film.

Example 76

A 1000 mL 3-neck round-bottom flask equipped with a Dean-Stark trap, condenser, mechanical stirrer, and nitrogen inlet was charged with 3,3'-BPoDA (50.884 g, 100 mass %, 106.36 mmol), pyromellitic dianhydride (4.094 g, 100 mass %, 18.77 mmol), m-PD (12.622 g, 100 mass %, 116.73 mmol), aniline (1.0605 g, 100 mass %, 1.0376 mL, 11.39 mmol), and o-DCB (252 g, 100 mass %, 193 mL). The flask was placed in an oil bath at 25° C., purged with nitrogen (15 scfh), agitated at 220 rpm, and heated to 185° C.

The reaction was concentrated to 30 wt % solids by removing 111 g of distillate (oDCB/$H_2O$). As the reaction progressed, it formed a pale-yellow precipitate. The reaction was stirred for a total of 8 hr. The flask was then removed from the oil bath and diluted with additional o-DCB (75 g), and then was allowed to cool to ambient temperature. The pale-yellow solids were collected using a vacuum filter (Whatman filter paper 4), which were then air-dried in the hood overnight. GPC analysis of a Haake grinds indicated this material had an Mw of 20,626, and the hot-pressing using the Carver auto press provided a transparent creasable amber colored film with a Tg of 273° C.

Example 77

A 1000 mL 3-neck round-bottom flask equipped with a Dean-Stark trap, condenser, mechanical stirrer, and nitrogen inlet was charged with 3,3'-BPoDA (50.884 g, 100 mass %, 106.36 mmol), DDS (26.409 g, 100 mass %, 106.36 mmol), aniline (0.2972 g, 100 mass %, 0.2907 mL, 3.19 mmol), octadecylamine (0.86 g, 100 mass %, 3.19 mmol) and o-DCB (291 g, 100 mass %, 223 mL). The flask was placed in an oil bath at 25° C., purged with nitrogen (15 scfh), agitated at 215-220 rpm, and heated to 185° C.

The reaction mixture was concentrated to 30% solids by removing 127 g of distillate (oDCB/$H_2O$). As the reaction progressed, the reaction mixture formed a yellow precipitate. After a total of 16 hr, the flask was then removed from the oil bath, and diluted with additional o-DCB (75 g) and allowed to cool to ambient temperature. The pale-yellow solids were collected using a vacuum filter (Whatman filter paper 4), which were then air-dried in the hood overnight. GPC analysis of a devolatilized sample indicated this material had an Mw of 25,069. The DSC measurement on Haake grinds afforded polymer with a Tg of 278° C., and the hot-pressing using the Carver auto press provided a transparent creasable amber colored film.

The results of examples 1-19, which include polymers made from biphenol dianhydride and m-PD and DDS, are summarized in Table 3. No chain stopper was present.

TABLE 3

| Composition | Units | E1 | E2 | E3 | E4 | E5 | E6 | E7 | E8 | E9 | E10 |
|---|---|---|---|---|---|---|---|---|---|---|---|
| 3,3'-BPoDA | mol % dianhydride | 100 | 100 | 100 | 100 | 100 | 100 | 100 | 100 | 100 | 100 |
| m-PD | mol % diamine | 20 | 40 | 40 | 40 | 45 | 50 | 50 | 50 | 50 | 50 |
| 4,4'-DDS | mol % diamine | 80 | 60 | 60 | 60 | 55 | 50 | 50 | 50 | 50 | 50 |
| PA | mol % | 5.5 | | | | | 3 | 4 | | | |
| Aniline | mol % | | 4.5 | 4.75 | 5 | 4.5 | | | 4.5 | 4.75 | 5 |

| Properties | Unit | E1 | E2 | E3 | E4 | E5 | E6 | E7 | E8 | E9 | E10 |
|---|---|---|---|---|---|---|---|---|---|---|---|
| Mw | g/mol | 33946 | 24866 | 21439 | 26094 | 24376 | 33946 | 24866 | 21439 | 26094 | 24376 |
| TG | ° C. | 282 | 281 | 275 | 282 | 279 | 284 | 281 | 276 | 273 | 276 |
| TGA, Air | ° C., Onset Temp | | 559 | 560 | — | — | | | 560 | 557 | 558 |
| TGA, N2 | ° C., Onset Temp | | 553 | 562 | — | — | | | 562 | 559 | 556 |
| Viscosity | P, 400° C. | 8953 | 3855 | 5492 | — | 4861 | | | 3150 | 1770 | 2705 |
| Visc. Change | %, 400° C., 1800 s | −3% | −10% | 7% | — | −2% | | | −7% | −12% | −5% |
| Film Appearance | Color | Amber | Amber | Amber | — | Amber | Amber | Amber | Amber | Amber | Amber |
| Polymer Phase | o-DCB | P | P | P | P | P | P | P | P | P | P |

| Composition | Units | E11 | E12 | E13 | E14 | E15 | E16 | E17 | E18 | E19 |
|---|---|---|---|---|---|---|---|---|---|---|
| 3,3'-BPoDA | mol % | 100 | 100 | 100 | 100 | 100 | 100 | 100 | 100 | 100 |
| m-PD | mol % | 55 | 55 | 60 | 60 | 60 | 60 | 60 | 65 | 80 |
| 4,4'-DDS | mol % | 45 | 45 | 40 | 40 | 40 | 40 | 40 | 35 | 20 |
| PA | mol % | | | | | | | 4.5 | | |
| Aniline | mol % | 2 | 4.5 | 2.88 | 4 | 4 | 4.5 | | 4 | 5.5 |

| Properties | Unit | E11 | E12 | E13 | E14 | E15 | E16 | E17 | E18 | E19 |
|---|---|---|---|---|---|---|---|---|---|---|
| Mw | g/mol | 30204 | 23419 | 36123 | 33731 | 30716 | 29803 | 33731 | 30328 | 29803 |
| TG | ° C. | 279 | 278 | 285 | 281 | 281 | 277 | 276 | 272 | 261 |
| TGA, Air | ° C., Onset Temp | 557 | 552 | 552 | — | | 553 | 553 | 556 | |
| TGA, N2 | ° C., Onset Temp | 548 | 544 | 554 | — | | 550 | 550 | 557 | |
| Viscosity | P, 400° C. | * | 5525 | 101150 | 23591 | | 12963 | 23591 | | |
| Visc. Change | %, 400° C., 1800 s | | −5% | −32% | −20% | | −0.09% | −20% | | |
| Film Appearance | Color | Amber | Amber | Amber | Amber | Amber | Amber | Amber | Amber | Amber |
| Polymer Phase | o-DCB | P | P | P | P | P | P | P | P | P |

*Could not be run

As shown in Table 3, the combination of m-PD and 4,4'-DDS can provide higher thermal stability as measured by TGA compared to the corresponding homopolymers (see comparative examples below). With the 40/60 to 60/40 range of the m-PD/4,4'-DSS mole ratio, less than or equal to 5 mol % chain stopper could achieve glass transition temperatures over 275° C. For 40/60 and 55/45 m-PD/4,4'-DDS compositions, the viscosity of the resin at 400° C. was also below 6000 P. At 60 mot % m-PD and higher, viscosities significantly exceeded 6000 P at all chain stopper concentrations. If 4,4'-DDS exceeded of this range, the Tg could exceed 275° C. even at high chain stopper loadings. However, the viscosity was greater than 6000 P.

The results of examples 2042, which include polymers derived from biphenol dianhydride and p-PD and 4,4'-ODA, are summarized in Table 4. No chain stopper was used.

TABLE 4

| Composition | Units | E20 | E21 | E22 | E23 | E24 | E25 | E26 | E27 | E28 | E29 | E30 |
|---|---|---|---|---|---|---|---|---|---|---|---|---|
| 3,3'-BPoDA | mol % | 100 | 100 | 100 | 100 | 100 | 100 | 100 | 100 | 100 | 100 | 100 |
| p-PD | mol % | 70 | 90 | 20 | 30 | 45 | 45 | 45 | 50 | 50 | 50 | 55 |
| 4,4'-ODA | mol % | 30 | 10 | 80 | 70 | 55 | 55 | 55 | 50 | 50 | 50 | 45 |
| PA | mol % | | | 7 | 7 | 4 | 6 | 5 | 5 | 5.5 | 6.2 | 5.5 |
| Aniline | mol % | 2.85 | 5.25 | | | | | | | | | |

TABLE 4-continued

| Properties | Unit | E20 | E21 | E22 | E23 | E24 | E25 | E26 | E27 | E28 | E29 | E30 |
|---|---|---|---|---|---|---|---|---|---|---|---|---|
| Mw | g/mol | 67904 | ND | 38349 | 42954 | 70717 | 76398 | 80996 | 42438 | 28622 | 35237 | 41503 |
| TG | ° C. | 280 | 276 | 259 | 265 | 278 | 276 | 278 | 273 | 269 | 270 | 274 |
| TM | ° C. | 420 | 420 | n.d. | n.d. | n.d. | n.d. | — | — | — | — | — |
| TGA, Air | ° C., Onset Temp | — | — | — | — | — | — | — | 557 | 566 | 567 | 559 |
| TGA, N2 | ° C., Onset Temp | — | — | — | — | — | — | — | 560 | 556 | 557 | 562 |
| Viscosity | P, 400° C. | — | * | * | 16859 | — | — | — | 16243 | 12833 | 12414 | 24488 |
| Visc. Change | %, 400° C., 1800 s | — | — | — | -2% | — | — | — | -26% | — | — | — |
| Film Appearance | Color | Amber | Amber | Amber | — | Amber | Amber | Amber | — | Amber | Amber | Amber |
| Polymer Phase | o-DCB | P | P | P | P | P | P | P | P | P | P | P |

| Composition | Units | E31 | E32 | E33 | E34 | E35 | E36 | E37 | E38 | E39 | E40 | E41 | E42 |
|---|---|---|---|---|---|---|---|---|---|---|---|---|---|
| 3,3'-BPoDA | mol % | 100 | 100 | 100 | 100 | 100 | 100 | 100 | 100 | 100 | 100 | 100 | 100 |
| p-PD | mol % | 55 | 55 | 60 | 60 | 60 | 60 | 65 | 65 | 65 | 65 | 65 | 80 |
| 4,4'-ODA | mol % | 45 | 45 | 40 | 40 | 40 | 40 | 35 | 35 | 35 | 35 | 35 | 20 |
| PA | mol % | 6.2 | 5.7 | 5.5 | 5.5 | 5.5 | 6.5 | 5.5 | 3.8 | 6 | 5.25 | | |
| Aniline | mol % | | | | | | | | | | | 5.25 | 5.25 |

| Properties | Unit | E31 | E32 | E33 | E34 | E35 | E36 | E37 | E38 | E39 | E40 | E41 | E42 |
|---|---|---|---|---|---|---|---|---|---|---|---|---|---|
| Mw | g/mol | 28334 | 35324 | 37906 | 26237 | 57042 | 30060 | 32631 | 61085 | 26869 | 31247 | 39246 | ND |
| TG | ° C. | 271 | 273 | 276 | 276 | 269 | 273 | 279 | 286 | 272 | 274 | 278.7 | 275.9 |
| TM | ° C. | — | — | — | 421 | — | — | 420 | 420 | 420 | 420 | 420 | 420 |
| TGA, Air | ° C., Onset Temp | 561 | 567 | 560 | 560 | — | 569 | — | — | — | — | 558 | 557 |
| TGA, N2 | ° C., Onset Temp | 557 | 559 | 563 | 563 | — | 562 | — | — | — | — | 563 | 560 |
| Viscosity | P, 400° C. | 7962 | 13716 | — | 35482 | — | 12833 | — | — | — | — | 45011 | 16243 |
| Visc. Change | %, 400° C., 1800 s | — | — | — | — | — | — | — | — | — | — | — | -26% |
| Film Appearance | Color | Amber | Amber | Amber | Hazy | Amber | Amber | Hazy | Hazy | Hazy | Hazy | Hazy | Hazy |
| Polymer Phase | o-DCB | P | P | P | P | P | P | P | P | P | P | P | P |

*Could not be run

For p-PD/4,4'-ODA copoly(etherimide)poly(etherimide) s, semicrystalline polymers are produced starting at 60 mol % diamine p-PD and greater. These materials, when semicrystalline, have a hazy appearance. Examples E24, E41, and E42 demonstrate that these materials have a viscosity at 400 PC, which is unexpected since the resin has small residual semi-crystalline component. At higher p-PD mot %, in E22 and E23, the viscosity cannot be measured at 400° C. in the parallel plate measurement. In the narrow range of 60 to 70 mol % p-PD with 30 to 40 mot % 4,4'-ODA, a copoly(etherimide) can be produced that is semi-crystalline yet still melt processable. All formulations were insoluble in the o-DCB polymerization process, even at 20 mol % of p-PD.

No formulation matched the combination of glass transition temperature, viscosity, and thermal onset temperature performance of m-PD and 4,4'-DDS copoly(etherimide) s. All formulations have a thermal onset temperature at or above the m-PD and 4,4'-DDS copoly(etherimide). Only a limited formulation range has a Tg at or above 275° C. Viscosity at 400° C. is generally higher than the m-PD/4, 4'-DDS copoly(etherimide)s, dependent on the chain stopper mol % added.

Table 5 summarizes the results of examples 57-64, which include polymers derived from 3,3'-biphenol dianhydride and p-PD and m-PD. For p-PD/m-PD copoly(etherimide), semicrystalline polymers were similarly produced at 65 mol % p-PD and 75 mol % p-PD. The 65 mol % p-PD and 35 mot % m-PD copoly(etherimide) have a viscosity at 400° C., similar to the p-PD/4,4'-ODA copoly(etherimide) examples. No amorphous copoly(etherimide) examples report a Tg above 273° C.

TABLE 5

| Composition | Units | E57 | E58 | E59 | E60 | E61 | E62 | E63 | E64 |
|---|---|---|---|---|---|---|---|---|---|
| 3,3'-BPoDA | mol % dianhydride | 100 | 100 | 100 | 100 | 100 | 100 | 100 | 100 |
| m-PD | mol % diamine | 25 | 35 | 35 | 35 | 50 | 30 | 25 | 80 |
| p-PD | mol % diamine | 75 | 65 | 65 | 65 | 50 | 70 | 75 | 20 |
| Chain Stopper | (w.r.t. total) | | | | | | | | |
| PA | mol % | | | | 6 | 5.25 | | 5.1 | 5.1 |
| Aniline | mol % | | 4.5 | 4.5 | | | 4.5 | | |

TABLE 5-continued

| Properties | Unit | E57 | E58 | E59 | E60 | E61 | E62 | E63 | E64 |
|---|---|---|---|---|---|---|---|---|---|
| Mw | g/mol | | 32602 | 22539 | 24831 | 33676 | 36233 | 40097 | 32156 |
| TG | °C. | 278 | 276 | 271 | 274 | 273 | 252 | 269 | 271 |
| TM | °C. | 420 | 420 | 420 | 420 | — | — | — | — |
| TGA, Air | °C., Onset Temp | | 551 | 551 | | 552 | — | — | — |
| TGA, N2 | °C., Onset Temp | | 543 | 543 | | 543 | — | — | — |
| Viscosity | P, 400° C. | | 16844 | | | 11996 | | | |
| Visc. Change | %, 400° C., 1800 s | | −8% | | | 2% | | | |
| Film Appearance | Color | N/A | Hazy | Hazy | Hazy | Amber | Amber | Amber | Amber |
| Polymer Phase | o-DCB | P | P | P | P | P | P | P | P |

Table 6 summarizes the results from examples 43-48, which include polymers derived from 3,3'-biphenol dianhydride and r-PD and 4,4'-ODA. In the 4,4'-ODA and n-PD copolymers, glass transition temperatures are slightly lower than comparative homopolymer examples (below) due to lower molecular weight. Samples are still processable and transparent. In samples with less than 50 mol % m-PD, the polymer remains soluble in o-DCB. Since other copolymer formulations of 4,4'-ODA precipitated, even at 10 mol % with p-PD, these results were unexpected.

TABLE 6

| Composition | Units | E43 | E44 | E45 | E46 | E47 | E48 |
|---|---|---|---|---|---|---|---|
| 3,3'-BPoDA | mol % dianhydride | 100 | 100 | 100 | 100 | 100 | 100 |
| m-PD | mol % diamine | 25 | 25 | 50 | 60 | 70 | 75 |
| 4,4'-ODA | mol % diamine | 75 | 75 | 50 | 40 | 30 | 25 |
| Chain Stopper | (w.r.t. total) | | | | | | |
| PA | mol % | 5.5 | 6.5 | 5.5 | 5.5 | 5.5 | 6.5 |

| Properties | Unit | E43 | E44 | E45 | E46 | E47 | E48 |
|---|---|---|---|---|---|---|---|
| TG | °C. | 261 | 258 | 262 | 261 | 261 | 266 |
| TGA, Air | °C., Onset Temp | 561 | 561 | 560 | — | — | 565 |
| TGA, N2 | °C., Onset Temp | 559 | 553 | 562 | — | — | 559 |
| TGA, Isothermal | Mass loss % | 1.6% | 1.80% | 1.5% | — | — | 1.6% |
| Viscosity | P, 400° C. | 8953 | 3855 | 5492 | — | — | 9472 |
| Visc. Change | %, 400° C., 1800 s | −3% | −10% | 7% | — | — | −5% |
| Film Appearance | Color | Amber | Amber | Amber | — | — | Amber |
| Polymer Phase | o-DCB | H | H | H | P | P | P |

Table 7 summarizes results from examples 49-56 and 70, including polymers derived from 3,3'-biphenol dianhydride and 4,4'-ODA and 4,4'-DDS.

TABLE 7

| Composition | Units | E49 | E50 | E51 | E52 | E53 | E54 | E55 | E56 | E70 |
|---|---|---|---|---|---|---|---|---|---|---|
| 3,3'-BPoDA | mol % dianhydride | 100 | 100 | 100 | 100 | 100 | 100 | 100 | 100 | 100 |
| 4,4'-ODA | mol % diamine | 40 | 45 | 50 | 50 | 50 | 50 | 50 | 55 | |
| 4,4'-DDS | mol % diamine | 60 | 55 | 50 | 50 | 50 | 50 | 50 | 45 | 100 |
| Chain Stopper | (w.r.t. total) | | | | | | | | | |
| PA | mol % | 5 | 4 | 5 | 4.5 | 4 | 2.87 | | 4 | |
| Aniline | mol % | | | | | | | 4.5 | | |
| Octadecyl amine | mol % | | | | | | | | | 4.5 |

| Properties | Unit | E49 | E50 | E51 | E52 | E53 | E54 | E55 | E56 | E70 |
|---|---|---|---|---|---|---|---|---|---|---|
| Mw | g/mol | 38191 | 41637 | 39776 | 38849 | 46877 | 56566 | 28244 | 41623 | 19799 |
| TG | °C. | 279 | 252 | 277 | 277 | 282 | 288 | 273 | 261 | 269 |
| TGA, Air | °C., Onset Temp | | | | 554 | | | | | |
| TGA, N2 | °C., Onset Temp | | | | 551 | | | | | |
| Viscosity | P, 400° C. | — | 15907 | — | 19968 | 30492 | 16243 | 3720 | — | 16243 |
| Visc. Change | %, 400° C., 1800 s | — | −6% | — | −11% | 8% | −26% | −14% | — | −26% |
| Film Appearance | Color | Amber | Amber | Amber | Amber | Amber | Amber | Amber | Amber | Dark brown |
| Polymer Phase | o-DCB | P | P | P | P | P | P | P | P | P |

Table 8 summarizes the results from examples 71-76, including polymers derived from the 3,3'-biphenol dianhydride in combination with a different dianhydride (4,4'-ODPA/PMDA) and m-PD.

Comparative Example 5

20 g of 3,3'-BPoDA+ p-PD homopolymer prepared from Example 66. Attempts to blend this polymer with and 20 g 3,3'-BPoDA+m-PD homopolymer polymer (C1) through Haake at 380° C., and static exposure to temperature of up to 420° C. were unsuccessful. The C1 phase of the material did melt, but all samples remained hazy. Temperatures beyond 400° C. caused significant discoloration of the resulting mixture, turning and amber color to dark brown. Glass transition temperatures remained 267° C. The lack of an increase in Tg demonstrated the inability for melt processing to incorporate the m-PD and p-PD homopolymers into a single blend.

TABLE 8

| Composition | Units | E71 | E72 | E73 | E74 | E75 | E76 |
|---|---|---|---|---|---|---|---|
| 3,3'-BPoDA | mol % dianhydride | 65 | 65 | 65 | 60 | 85 | 85 |
| 4,4'-ODPA | mol % dianhydride | 35 | 35 | 35 | 40 | | |
| PMDA | mol % dianhydride | | | | | 15 | 15 |
| m-PD | mol % diamine | 100 | 100 | 100 | 100 | 100 | 100 |
| Chain Stopper | (w.r.t. total) | | | | | | |
| Aniline | mol % | 2.27 | 3.27 | 3.92 | 4 | 3.06 | 4.5 |

| Properties | Unit | E71 | E72 | E73 | E74 | E75 | E76 |
|---|---|---|---|---|---|---|---|
| Mw | g/mol | 31252 | 33095 | 31042 | 24190 | 24880 | 20626 |
| TG | ° C. | 279 | 275 | 272 | 272 | 278 | 273 |
| TGA, Air | ° C., Onset Temp | 554 | 555 | 553 | 556 | 540 | 540 |
| TGA, N2 | ° C., Onset Temp | — | — | — | — | — | — |
| TGA, isothermal | mass loss, % | — | 1.7% | — | — | 4.2% | 4.3% |
| Viscosity | P, 400° C. | Could not run | 81110 | — | 16487 | 33068 | 10916 |
| Visc. Change | %, 400° C., 1800 s | — | −51% | — | −13% | −46% | −12% |
| Film Appearance | Color | Amber | Amber | Amber | Amber | Amber | — |
| Polymer Phase | o-DCB | P | P | P | P | P | p |

For comparison, the following examples illustrate the preparation of various homopolymers of 3,3'-biphenol dianhydride and a single diamine (m-PD, p-PD, 4,4'-ODA, or 4,4'-DDS). The homopolymer compositions of comparative examples 14 are shown in Table 9, as well as physical properties for each sample. As seen in Table 9, these polymers have glass transition temperatures of 270° C. or less (m-PD and 4,4'-ODA) or greater than 285° C. (p-PD and 4,4'-DDS) when made as homopolymers with 3,3'-biphenol dianhydride. The 3,3'-biphenol dianhydride and 4,4'-DDS homopolymer was unstable at high melt processing temperatures as a homopolymer. The biphenol and p-PD homopolymer yielded a semi-crystalline polymer which does not provide a transparent material.

Comparative Example 6

To further demonstrate the difficulty of incorporating the Example 66 material, unfilled poly(etherimide) obtained as ULTEM 1000 from SABIC with a Tg of 217° C. was

TABLE 9

| Composition | Units | CE1 | CE2 | CE3 | CE4 |
|---|---|---|---|---|---|
| 3,3'-BPoDA | mol % dianhydride | 100 | 100 | 100 | 100 |
| m-PD | mol % diamine | 100 | | | |
| p-PD | mol % diamine | | 100 | | |
| 4,4'-ODA | mol % diamine | | | 100 | |
| 4,4'-DDS | mol % diamine | | | | 100 |
| Chain Stopper | (w.r.t. total) | | | | |
| Aniline | mol % | | | | |
| PA | mol % | 4.5 | 4.5 | 4.5 | 4.5 |

| Properties | Unit | CE1 | CE2 | CE3 | CE4 |
|---|---|---|---|---|---|
| TG | ° C. | 265 | 287 | 268 | 288 |
| TM | ° C. | — | ~420 | — | — |
| TGA Air | ° C., Onset Temp | 582 | 544 | 558 | 540 |
| TGA N2 | ° C., Onset Temp | 547 | 541 | 564 | |
| TGA, Isothermal | Mass loss % | 1.9% | | 1.8% | 5.2% |
| Viscosity | P, 400° C. | 3460 | Unable to process | — | 16686 |
| Visc. Change | %, 400° C., 1800 s | 25% | Unable to process | — | −19% |
| Film Appearance | Color | Amber/brown | Opaque | Amber/brown | Dark brown |
| Polymer Phase | o-DCB | P | P | H | P |
| Polymer Phase | Benzonitrile | H | P | H | H |
| Polymer Phase | Sulfolane | H | P | H | H |

The effects of blending two poly(etherimide)s each made from 3,3'-biphenol dianhydride and two different diamines were also examined.

obtained. These materials were compounded through a 26 mm twin screw extruder with a die temperature of 410° C. Attempts to reach higher melt temperatures at the die were not successful. Polymer strands were hazy, and the glass transition temperature of the resulting blend was 217° C., equivalent to the original ULTEM 1000 sample.

Comparative Example 7

45 g of 3,3'-BPoDA+DDS homopolymer prepared from Example 69 and 55 g of BPoDA+m-PD homopolymer CE1 were compounded together in the Haake at 380° C. and produced a transparent material with a Tg of 272° C. as measured by DSC. The onset temperature as recorded by TGA is similar to E5, but E5 demonstrates is significantly lower mass loss from isothermal TGA at 450° C. Isothermal mass loss behavior in CE7 is closer to CE4 than CE1. The isothermal mass loss appeared to be inhibited when the polymer was formed as a copolyetherimides versus a physical blend.

Incorporations of both diamines into the same chain result in an unexpected advantageous performance, versus the blend on the two homopolymers.

The results of Comparative Examples 5-7 are shown in Table 10. Table 4 also include the results from inventive Example 5 described above for comparison.

TABLE 10

| Composition | Units | CE5 | CE6 | CE7 | E5 |
|---|---|---|---|---|---|
| CE1 | wt % | 50 | 10 | 45 | |
| CE2 | wt % | 50 | | | |
| CE4 | wt % | | | 55 | |
| ULTEM 1000 | wt % | | 90 | | |
| E5 | wt % | | | | 100 |

| Properties | Unit | CE5 | CE6 | CE7 | E5 |
|---|---|---|---|---|---|
| TG | ° C. | 267 | 217 | 272 | 279 |
| TM | ° C. | 420 | 420 | — | — |
| TGA Air | ° C., Onset Temp | | | 551 | 560 |
| TGA N2 | ° C., Onset Temp | | | 551 | 551 |
| TGA, Isothermal | Mass loss % | Not tested | Not tested | 4.1% | 2% |
| Viscosity | P, 400° C. | Not tested | Not tested | 4784 | 5525 |
| Visc. Change | %, 400° C., 1800 s | Not tested | Not tested | 4% | −5% |
| Film Appearance | Color | Hazy/Opaque | Hazy/Opaque | Brown | Amber |

This disclosure further encompasses the following aspects.

Aspect 1: A poly(etherimide) comprising repeating units derived from polymerization of 60 to 100 mole percent, based on total moles of dianhydride, of a biphenol dianhydride of the formula

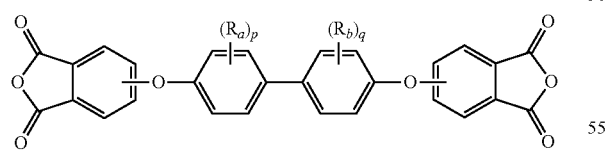

wherein $R^a$ and $R^b$ are each independently a halogen or a monovalent $C_{1-6}$ alkyl group and p and q are each independently an integer of 0 to 4, preferably wherein p and q are each 0, and wherein greater than 80% of the divalent bonds of the biphenol group are in the 3,3' position; 0 to 40 weight percent, based on total moles of dianhydride, of a dianhydride different from the biphenol dianhydride; and 100 mole percent, based on total moles of diamine, of an organic diamine comprising a first organic diamine and, optionally, a second organic diamine different from the first organic diamine, provided that when the dianhydride different from the biphenol dianhydride is present in an amount greater than 0, the organic diamine consists of the first organic diamine and when the dianhydride different from the biphenol dianhydride is not present, the organic diamine comprises the first organic diamine and the second organic diamine.

Aspect 2: The poly(etherimide) of aspect 1, comprising repeating units derived from polymerization of 100 mole percent, based on total moles of dianhydride, of the biphenol dianhydride; and 100 mole percent, based on total moles of diamine, of the first organic diamine and the second organic diamine.

Aspect 3: The poly(etherimide) of aspect 1, comprising repeating units derived from polymerization of 70 to 95 mole percent, based on total moles of dianhydride, of the biphenol dianhydride; 5 to 30 weight percent, based on total moles of dianhydride, of the dianhydride different from the biphenol dianhydride; and 100 mole percent, based on total moles of diamine, of the first organic diamine.

Aspect 4: The poly(etherimide) of any of aspects 1 to 3, wherein the dianhydride different from the biphenol dianhydride is of the formula

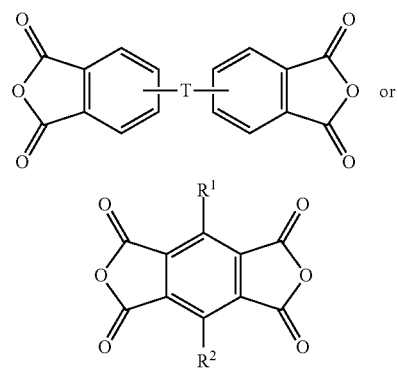

wherein T is —O— or a group of the formula —O—Z—O— wherein the divalent bonds of the —O— or the —O—Z—O— group are in the 3,3', 3,4', 4,3', or the 4,4' positions, and Z is an aromatic $C_6u$ monocyclic or polycyclic group optionally substituted with 1 to 6 $C_{1-8}$ alkyl groups, 1-8 halogen atoms, or a combination comprising at least one of the foregoing; and $R^1$ and $R^2$ are each independently a hydrogen, a $C_{1-8}$ alkyl group, a halogen, or a combination thereof, preferably hydrogen; preferably wherein Z is a group derived from a dihydroxy compound of the formula

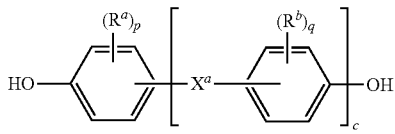

wherein $R^a$, $R^b$, p and q are as defined in aspect 1; c is 0 to 4; and $X^a$ is —O—, —S—, —S(O)—, —SO$_2$—, —C(O)—, or a $C_{1-18}$ organic bridging group; preferably wherein the dianhydride different from the biphenol dianhydride is present in an amount of 6 to 21 mole percent, based on total moles of dianhydride.

Aspect 5: The poly(etherimide) of any of aspects 1 to 4, wherein the poly(etherimide) further comprises at least one chain end derived from a chain stopper, preferably a monoamine chain stopper or a monoanhydride chain stopper, more preferably aniline or phthalic anhydride.

Aspect 6: The poly(etherimide) of any of aspects 1 to 5, wherein the organic diamine comprises 3,3'-diaminodiphenylsulfone, 3,4'-diaminodiphenylsulfone, 4,4'-diaminodiphenylsulfone, 3,3'-oxydianiline, 3,4'-oxydianiline, 4,4'-oxydianiline, meta-phenylene diamine, para-phenylene diamine, ortho-phenylene diamine, or a combination thereof.

Aspect 7: The poly(etherimide) of any of aspects 1 or 3 to 6, wherein the first organic diamine comprises meta-phenylene diamine and the second organic diamine comprises 4,4'-diaminodiphenylsulfone; or the first organic diamine comprises para-phenylene diamine and the second organic diamine comprises 4,4'-oxydianiline; or the first organic diamine comprises para-phenylene diamine and the second organic diamine comprises meta-phenylene diamine; or the first organic diamine comprises meta-phenylenediamine and the second organic diamine comprises 4,4'-oxydianiline.

Aspect 8: The poly(etherimide) of any of aspects 1 to 7, wherein the poly(etherimide) has one or more of a glass transition temperature of greater than 240° C., preferably 270 to 290° C., more preferably 275 to 280° C.; an onset thermal decomposition temperature of greater than 525° C. under nitrogen or air; and a viscosity less than 20000 P at 400° C., preferably less than 8000 P at 400° C.

Aspect 9: The poly(etherimide) of aspect 1, derived from polymerization of 100 mole percent of a biphenol dianhydride of the formula

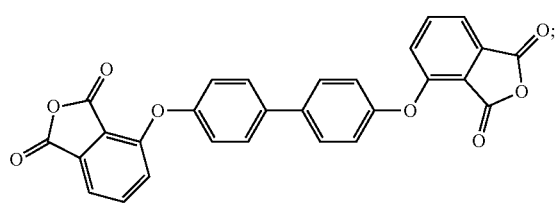 [SMILES: O=C1OC(=O)c2c(Oc3ccc(-c4ccc(Oc5cccc6c5C(=O)OC6=O)cc4)cc3)cccc21]

100 mole percent of the organic diamine; wherein the organic diamine comprises the first organic diamine and the second organic diamine; wherein the first organic diamine comprises meta-phenylene diamine and the second organic diamine comprises 4,4'-diaminodiphenylsulfone; or the first organic diamine comprises para-phenylene diamine and the second organic diamine comprises 4,4'-oxydianiline; or the first organic diamine comprises para-phenylene diamine and the second organic diamine comprises meta-phenylene diamine; or the first organic diamine comprises meta-phenylenediamine and the second organic diamine comprises 4,4'-oxydianiline; and 1 to 10 mole percent of a chain stopper, based on the total moles of the dianhydride, diamine, and the chain stopper.

Aspect 10: The poly(etherimide) of aspect 1, derived from polymerization of 100 mole percent of a biphenol dianhydride of the formula

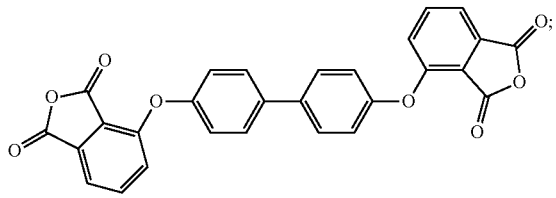 [SMILES: O=C1OC(=O)c2c(Oc3ccc(-c4ccc(Oc5cccc6c5C(=O)OC6=O)cc4)cc3)cccc21]

40 to 60 mole percent of the first organic diamine, wherein the first organic diamine comprises meta-phenylene diamine; 40 to 60 mole percent of the second organic diamine, wherein the second organic diamine comprises 4,4'-diaminodiphenylsulfone; and 4 to 6 mole percent of a chain stopper, based on the total moles of the dianhydride, diamine, and the chain stopper.

Aspect 11: A method of making a poly(etherimide), the method comprising contacting 60 to 100 mole percent, based on total moles of dianhydride, of a biphenol dianhydride of the formula

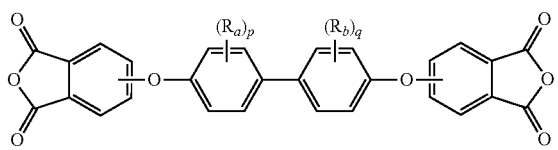

wherein $R^a$ and $R^b$ are each independently a halogen or a monovalent $C_{1-6}$ alkyl group and p and q are each independently an integer of 0 to 4, preferably wherein p and q are each zero, and wherein greater than 80% of the divalent bonds of the biphenol group are in the 3,3' position; 0 to 40 weight percent, based on total moles of dianhydride, of a dianhydride different from the biphenol dianhydride; and 100 mole percent, based on total moles of diamine, of an organic diamine comprising a first organic diamine and, optionally, a second organic diamine different from the first organic diamine, provided that when the dianhydride different from the biphenol dianhydride is present in an amount greater than 0, the organic diamine consists of the first organic diamine and when the dianhydride different from the biphenol dianhydride is not present, the organic diamine comprises the first organic diamine and the second organic diamine; under conditions effective to provide a poly(etherimide).

Aspect 12: The method of aspect 11, wherein the contacting is in the presence of a solvent, preferably ortho-dichlorobenzene, para-dichlorobenzene, meta-dichlorobenzene, meta-cresol, para-cresol, ortho-cresol, N-methylpyrrolidone, veratrole, chlorobenzene, xylene, 1,2,4-trichlorobenzene, 1,3,4-trichlorobenzene, ethyl benzoate, triglyme, benzonitrile, 3-nitrotoluene, 2-nitrotoluene, 1-nitrotoluene, 1,3-dimethyl-2-imidazolidinone, dimethyl acetamide, diphenyl ether, phenetole, sulfolane, or a combination thereof.

Aspect 13: The method of aspect 11 or 11, wherein the conditions effective to provide the poly(etherimide) comprise a temperature of 170 to 380° C., a solids content of 1 to 50 weight percent, and, optionally, wherein the method further comprises devolatilizing the poly(etherimide) at 360 to 390° C. for 1 to 30 minutes.

Aspect 14: An article comprising the poly(etherimide) of any one of aspects 1 to 10 or a poly(etherimide) made by the method of any one of claims 11 to 13.

Aspect 15: The article of aspect 14, wherein the article is an optoelectronic component, an extruded film, or an extruded sheet.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. The term "combination thereof" as used herein includes one or more of the listed elements, and is open, allowing the presence of one or more like elements not named. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—NO$_2$), a cyano (—CN), a $C_{1-6}$ alkyl sulfonyl (—S(=O)$_2$-alkyl), a $C_{6-12}$ aryl sulfonyl (—S(=O)$_2$-aryl), a thiol (—SH), a thiocyano (—SCN), a tosyl (CH$_3$C$_6$H$_4$SO$_2$—), a $C_{3-12}$ cycloalkyl, a $C_{2-12}$ alkenyl, a $C_{5-2}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example—CH$_2$CH$_2$CN is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A poly(etherimide) comprising repeating units derived from polymerization of 100 mole percent, based on total moles of dianhydride, of a biphenol dianhydride of the formula

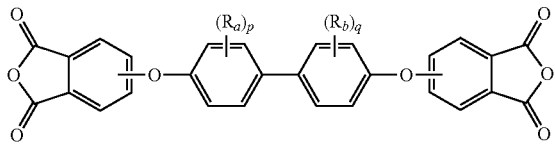

wherein $R^a$ and $R^b$ are each independently a halogen or a monovalent $C_{1-6}$ alkyl group and p and q are each independently an integer of 0 to 4, and wherein greater than 80% of the divalent bonds of the biphenol group are in the 3,3' position; and 100 mole percent, based on total moles of diamine, of an organic diamine comprising a first organic diamine and a second organic diamine different from the first organic diamine, wherein the poly(etherimide) does not exhibit a melting point as measured by differential scanning calorimetry.

2. The poly(etherimide) of claim 1, wherein the poly(etherimide) further comprises at least one chain end derived from a chain stopper.

3. The poly(etherimide) of claim 1, wherein the organic diamine comprises 3,3'-diaminodiphenylsulfone, 3,4'-diaminodiphenylsulfone, 4,4'-diaminodiphenylsulfone, 3,3'-oxydianiline, 3,4'-oxy dianiline, 4,4'-oxydianiline, meta-phenylene diamine, para-phenylene diamine, ortzo-phenylene diamine, or a combination thereof.

4. The poly(etherimide) of claim 1, wherein the first organic diamine comprises meta-phenylene diamine and the second organic diamine comprises 4,4'-diaminodiphenylsulfone; or the first organic diamine comprises meta-phenylenediamine amine and the second organic diamine comprises 4,4'-oxydianiline.

5. The poly(etherimide) of claim 1, wherein the poly(etherimide) has one or more of a glass transition temperature of greater than 240° C., as determined by differential scanning calorimetry;

an onset thermal decomposition temperature of greater than 525° C. under nitrogen or air, as determined by Thermal Gravimetric Analysis; and a viscosity less than 20000 P at 400° C., as determined according to ASTM D4440.

6. The poly(etherimide) of claim 1, derived from polymerization of 100 mole percent of a biphenol dianhydride of the formula

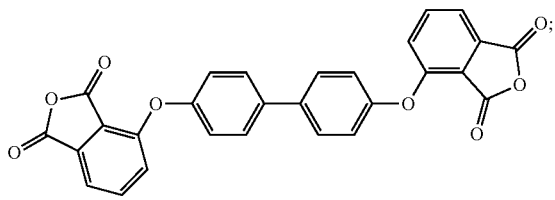 [SMILES: O=C1OC(=O)c2c(Oc3ccc(-c4ccc(Oc5cccc6c5C(=O)OC6=O)cc4)cc3)cccc21]

100 mole percent of the organic diamine;

wherein the organic diamine comprises the first organic diamine and the second organic diamine; wherein the first organic diamine comprises meta-phenylene diamine and the second organic diamine comprises 4,4'-diaminodiphenylsulfone; or the first organic diamine comprises meta-phenylenediamine and the second organic diamine comprises 4,4'-oxydianiline; and 1 to 10 mole percent of a chain stopper, based on the total moles of the dianhydride, diamine, and the chain stopper.

7. The poly(etherimide) of claim 1, derived from polymerization of 100 mole percent of a biphenol dianhydride of the formula

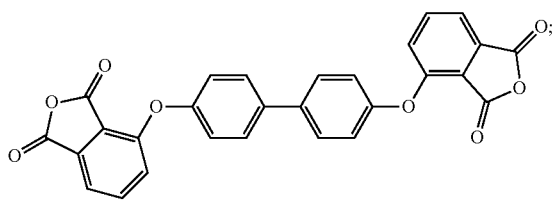 [SMILES: O=C1OC(=O)c2c(Oc3ccc(-c4ccc(Oc5cccc6c5C(=O)OC6=O)cc4)cc3)cccc21]

40 to 60 mole percent of the first organic diamine, wherein the first organic diamine comprises meta-phenylene diamine;

40 to 60 mole percent of the second organic diamine, wherein the second organic diamine comprises 4,4'-diaminodiphenylsulfone; and 4 to 6 mole percent of a chain stopper, based on the total moles of the dianhydride, diamine, and the chain stopper.

8. A method of making a poly(etherimide), the method comprising contacting 100 mole percent, based on total moles of dianhydride, of a biphenol dianhydride of the formula

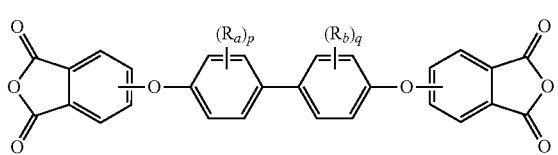

wherein R and $R^b$ are each independently a halogen or a monovalent C alkyl group and p and q are each independently an integer of 0 to 4, and wherein greater than 80% of the divalent bonds of the biphenol group are in the 3,3' position; and 100 mole percent, based on total moles of diamine, of an organic diamine comprising a first organic diamine and a second organic diamine different from the first organic diamine;

under conditions effective to provide a poly(etherimide), wherein the poly(etherimide) does not exhibit a melting point as measured by differential scanning calorimetry.

9. The method of claim 8, wherein the contacting is in the presence of a solvent.

10. The method of claim 8, wherein the conditions effective to provide the poly(etherimide) comprise a temperature of 170 to 380° C., a solids content of 1 to 50 weight percent, and, optionally, wherein the method further comprises devolatilizing the poly(etherimide) at 360 to 390° C. for 1 to 30 minutes.

11. An article comprising the poly(etherimide) of claim 1.

12. The article of claim 11, wherein the article is an optoelectronic component, an extruded film, or an extruded sheet.

* * * * *